United States Patent
Hoevel et al.

(10) Patent No.: US 11,098,151 B2
(45) Date of Patent: Aug. 24, 2021

(54) HARDENABLE POLYMER COMPOSITION

(71) Applicant: BASF SE, Ludwigshafen am Rhein (DE)

(72) Inventors: Bernd Hoevel, Ludwigshafen (DE); Angelika Roser, Ludwigshafen (DE); Juergen Pfister, Ludwigshafen (DE); Thomas Christ, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 114 days.

(21) Appl. No.: 16/340,761

(22) PCT Filed: Oct. 13, 2017

(86) PCT No.: PCT/EP2017/076245
§ 371 (c)(1),
(2) Date: Apr. 10, 2019

(87) PCT Pub. No.: WO2018/069526
PCT Pub. Date: Apr. 19, 2018

(65) Prior Publication Data
US 2020/0048394 A1    Feb. 13, 2020

(30) Foreign Application Priority Data
Oct. 14, 2016   (EP) .................................... 16194003

(51) Int. Cl.
*C08F 299/02* (2006.01)
*C09D 153/00* (2006.01)
*C09J 153/00* (2006.01)

(52) U.S. Cl.
CPC ........ *C08F 299/024* (2013.01); *C09D 153/00* (2013.01); *C09J 153/00* (2013.01); *C09J 2301/416* (2020.08)

(58) Field of Classification Search
CPC .. C08F 2/48; C08F 2/50; C08F 220/18; C08F 220/11804; C08F 220/1808; C08F 290/068; C08F 299/024; C08G 77/442; C08L 51/085; C09D 153/00; C08J 151/085; C08J 153/00; C08J 2301/304; C08J 2301/416
See application file for complete search history.

(56) References Cited

U.S. PATENT DOCUMENTS

| | | | |
|---|---|---|---|
| 6,280,911 B1 | 8/2001 | Trefonas, III | |
| 7,081,494 B2 * | 7/2006 | Fujita | C08F 8/42 522/100 |
| 2004/0029990 A1 | 2/2004 | Fujita et al. | |
| 2004/0249022 A1 | 12/2004 | Su | |
| 2006/0160918 A1 | 7/2006 | Fujita et al. | |
| 2007/0054088 A1 | 3/2007 | Matijasic et al. | |
| 2007/0249484 A1 | 10/2007 | Benkhoff et al. | |
| 2008/0177001 A1 | 7/2008 | Fujita et al. | |
| 2010/0087576 A1 | 4/2010 | Prasse | |
| 2010/0105794 A1 | 4/2010 | Dietliker et al. | |
| 2012/0238695 A1 | 9/2012 | Zander et al. | |
| 2013/0197141 A1 | 8/2013 | Luckert et al. | |
| 2015/0376476 A1 | 12/2015 | Rahim et al. | |
| 2016/0346170 A1 | 12/2016 | Fornof et al. | |

FOREIGN PATENT DOCUMENTS

| | | |
|---|---|---|
| DE | 10 2004 018 548 A1 | 11/2005 |
| DE | 10 2011 003 425 A1 | 8/2012 |
| EP | 1 179 567 A1 | 2/2002 |
| EP | 2 172 525 A1 | 4/2010 |
| EP | 2 199 347 A1 | 6/2010 |
| EP | 2 960 298 A1 | 12/2015 |
| JP | 2012-188594 A | 10/2012 |
| WO | WO 2004/083302 A1 | 9/2004 |
| WO | WO 2006/008251 A2 | 1/2006 |
| WO | WO 2008/119688 A1 | 10/2008 |
| WO | WO 2015/126657 A1 | 8/2015 |

OTHER PUBLICATIONS

International Search Report dated Nov. 22, 2017 in PCT/EP2017/076245, citing documents AL through AR therein, 4 pages.
U.S. Appl. No. 15/575,395, filed Nov. 20, 2017, US 2018-0148612 A1, Hoevel, B., et al.

* cited by examiner

*Primary Examiner* — Sanza L. McClendon
(74) *Attorney, Agent, or Firm* — Faegre Drinker Biddle & Reath LLP

(57) ABSTRACT

The present invention relates to a hardenable polymer composition containing at least one acrylate compound, at least one silyl-terminated polymer and at least one photoinitiator, to the use of the polymer composition as or in an adhesive, a sealant, gasket, knifing filler or coating composition, and to an adhesive composition, a sealant composition, a gasket composition, a knifing filler composition or a coating composition comprising the polymer composition.

19 Claims, No Drawings

HARDENABLE POLYMER COMPOSITION

TECHNICAL BACKGROUND

The present invention relates to a hardenable polymer composition containing at least one acrylate compound, at least one silyl-terminated polymer and at least one photoinitiator, to the use of the polymer composition as or in an adhesive, a sealant, gasket, knifing filler or coating composition, and to an adhesive composition, a sealant composition, a gasket composition, a knifing filler composition or a coating composition comprising the polymer composition.

Acrylic-based UV curable adhesives are generally hot-melt adhesives. Hot melt adhesive (HMA), also known as hot glue, is a form of thermoplastic adhesive that is supplied in different forms ranging from solid cylindrical sticks of various diameters up to pillows or blocks in siliconized paper, designed to be melted in an electric hot glue machine (i.e. melting pots, heated ring mains, guns etc). The glue squeezed out of the heated nozzle is initially hot enough to achieve low enough viscosity to wet the surface appropriately. The glue is tacky when hot, and solidifies in a few seconds to one minute. Hot melt adhesives can also be applied by slot dies, curtain coating or spraying. There are also hot melt adhesives that maintain their tackiness after dispensing even at room temperature. Those hot melts are commonly referred to as hot melt pressure sensitive adhesives (HM-PSA)

Hot melt pressure sensitive adhesives are used, for example, in tapes, and show a good surface tack (good adhesion). However, even after prolonged UV radiation to cure the polymers, thicker layers thereof remain elastomeric and do not develop strong cohesive forces. Strong cohesive forces are however a desired property for certain applications, for example in specialty tapes with thicker adhesive layers or in tapes with semi-structural properties.

For many applications it is desirable to have controllable adhesive forces at the beginning of the bonding process (known as green strength), so that the substrates to be bonded to each other can still be adjusted or corrected in their relative position but already show a certain bonding, and that after adjustment or correction strong adhesive and cohesive forces develop (final strength).

WO 2004/083302 relates to a UV cured hot-melt adhesive containing a polyacrylate that can be melted and cross-linked with UV light and an oligomer compound containing a functional group that can be cross-linked with UV light. The acResin® polyacrylate used therein shows good adhesive properties, but is not suitable for applications in which stronger adhesive and cohesive forces are required.

Moisture-crosslinkable polymer compositions based on silyl-terminated polymers (STPs) and their use in sealants, adhesives and coating compositions are known, for example from US 2013/197141, EP 2199347, EP2172525, DE 10 2004018548 or DE 102011003425. In the presence of atmospheric moisture, STPs with hydrolyzable substituents, such as alkoxy groups, are capable of condensing with one another yet at room temperature; resulting thus in cured or crosslinked polymers. Depending on the content of silyl groups with hydrolysable substituents and the structure of these silyl groups, mainly long-chain polymers (thermoplastics), relatively wide-mesh, three-dimensional networks (elastomers) or highly crosslinked systems (thermosets) are formed during this process.

However, these STPs do not unify the above-described desired properties, either.

It was the object of the invention to provide an adhesive composition which unifies both above-described properties, i.e. controllable adhesive forces at the beginning of the bonding process and subsequent development of strong adhesive and cohesive forces.

Surprisingly it was found that the object is achieved when acrylate compounds are combined with silyl-terminated polymers (STPs). Surprisingly, the STPs are miscible with the claimed acrylate compounds at arbitrary ratios and their different properties truly complement one another. Thus, the adhesion characteristics—more pronounced pressure-sensitive adhesion properties or more pronounced strong cohesion properties—can be fine-tuned for the specific application.

SUMMARY OF THE INVENTION

This, in a first aspect, the invention relates to a hardenable polymer composition comprising
(a) at least one acrylate compound;
(b) at least one silyl-terminated polymer; and
(c) at least one photoinitiator.

In another aspect, the invention relates to the use of the polymer composition as or in an adhesive, a sealant, gasket, knifing filler or coating composition, and to an adhesive composition, a sealant composition, a gasket composition, a knifing filler composition or a coating composition comprising the polymer composition.

DETAILED DESCRIPTION OF THE INVENTION

As a matter of course, the at least one acrylate compound and the at least one silyl-terminated polymer are different compounds which differ in at least one structural element, e.g. in the presence or absence of a functional group. Preferably, the at least one acrylate compound and the at least one silyl-terminated polymer differ at least by the acrylate compound not having any silyl terminal group.

In the present invention, the terms "curing" and "cross-linking" are used interchangeably, referring to the toughening or hardening of a polymer material by cross-linking of polymer chains.

The term "alkyl" as used herein and in the alkyl moieties of alkoxy, hydroxyalkyl and the like refers to saturated straight-chain or branched hydrocarbon radicals having 1 to 2 ("$C_1$-$C_2$-alkyl"), 1 to 3 ("$C_1$-$C_3$-alkyl"), 1 to 4 ("$C_1$-$C_4$-alkyl"), 2 to 4 ("$C_1$-$C_4$-alkyl"), 1 to 6 ("$C_1$-$C_6$-alkyl"), 1 to 8 ("$C_1$-$C_8$-alkyl"), 3 to 8 ("$C_1$-$C_8$-alkyl"), 4 to 8 ("$C_1$-$C_8$-alkyl"), 1 to 10 ("$C_1$-$C_{10}$-alkyl"), 2 to 10 ("$C_1$-$C_{10}$-alkyl"), 1 to 12 ("$C_1$-$C_{12}$-alkyl"), 1 to 16 ("$C_1$-$C_{16}$-alkyl") or 1 to 20 ("$C_1$-$C_{20}$-alkyl") carbon atoms. $C_1$-$C_2$-Alkyl is methyl or ethyl. Examples for $C_1$-$C_3$-alkyl are, in addition to those mentioned for $C_1$-$C_2$-alkyl, n-propyl and isopropyl. Examples for $C_1$-$C_4$-alkyl are, in addition to those mentioned for $C_1$-$C_3$-alkyl, n-butyl, 1-methylpropyl (sec-butyl), 2-methylpropyl (isobutyl) or 1,1-dimethylethyl (tert-butyl). Examples for $C_2$-$C_4$-alkyl are those mentioned for $C_1$-$C_4$-alkyl, except for methyl. Examples for $C_1$-$C_6$-alkyl are, in addition to those mentioned for $C_1$-$C_4$-alkyl, n-pentyl, 1-methylbutyl, 2-methylbutyl, 3-methylbutyl, 2,2-dimethylpropyl, 1-ethylpropyl, 1,1-dimethylpropyl, 1,2-dimethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, or 1-ethyl-2-methylpropyl. Examples for $C_1$-$C_8$-alkyl are, in addition to those mentioned for $C_1$-$C_6$-alkyl, n-heptyl, n-octyl, 2-ethylhexyl and positional isomers thereof. Examples for $C_3$-$C_8$-alkyl are those mentioned for $C_1$-$C_8$-alkyl, except for methyl and ethyl. Examples for $C_4$-$C_8$-alkyl are those mentioned for $C_1$-$C_8$-alkyl, except for methyl, ethyl, n-propyl and isopropyl. Examples for $C_1$-$C_{10}$-alkyl are, in addition to those mentioned for $C_1$-$C_8$-alkyl, n-nonyl, n-decyl and positional isomers thereof. Examples for $C_2$-$C_{10}$-alkyl are those mentioned for $C_1$-$C_{10}$-alkyl, except for methyl. Examples for $C_1$-$C_{12}$-alkyl are, in addition to those mentioned for $C_1$-$C_{10}$-alkyl, n-undecyl, n-dodecyl, and positional isomers thereof. Examples for $C_1$-$C_{16}$-alkyl are, in addition to those mentioned for $C_1$-$C_{12}$-alkyl, n-tridecyl, n-tetradecyl, n-pentadecyl, n-hexadecyl and positional isomers thereof. Examples for $C_1$-$C_{20}$-alkyl are, in addition to those mentioned for $C_1$-$C_{16}$-alkyl, n-heptadecyl, n-octadecyl, n-nonadecyl, n-eicosyl and positional isomers thereof.

The term "hydroxyalkyl" denotes an alkyl group, as mentioned above, in which one hydrogen atom is replaced by a hydroxyl group. $C_2$-$C_4$-Hydroxyalkyl is a $C_2$-$C_4$-alkyl group in which one hydrogen atom is replaced by a hydroxyl group. Examples are 1-hydroxyethyl, 2-hydroxyethyl, 1-hydroxypropyl, 2-hydroxypropyl, 3-hydroxypropyl, 1-hydroxy-1-methylethyl, 2-hydroxy-1-methylethyl, 1-hydroxybutyl, 2-hydroxybutyl, 3-hydroxybutyl, 4-hydroxybutyl, 1-hydroxy-1-methylpropyl, 2-hydroxy-1-methylpropyl, 3-hydroxy-1-methylpropyl, 1-(hydroxymethyl)-propyl, 1-hydroxy-2-methylpropyl, 2-hydroxy-2-methylpropyl, 3-hydroxy-2-methylpropyl, 2-(hydroxymethyl)-propyl, and 1-(hydroxymethyl)-2-methyl-ethyl. $C_2$-$C_{10}$-Hydroxyalkyl is a $C_2$-$C_{10}$-alkyl group in which one hydrogen atom is replaced by a hydroxyl group. Examples are, in addition to those mentioned above for $C_2$-$C_4$-hydroxyalkyl, 1-, 2-, 3-, 4- or 5-hydroxypentyl, 1-, 2-, 3-, 4-, 5- or 6-hydroxyhexyl, 1-, 2-, 3-, 4-, 5-, 6- or 7-hydroxyheptyl, 1-, 2-, 3-, 4-, 5-, 6-, 7- or 8-hydroxyoctyl, 1-, 2-, 3-, 4-, 5-, 6-, 7-, 8- or 9-hydroxynonyl, 1-, 2-, 3-, 4-, 5-, 6-, 7-, 8-, 9- or 10-hydroxydecyl and isomers thereof. Among these, preference is given to radicals in which the hydroxyl group is not bound to the attachment point of hydroxyalkyl to the remainder of the molecule, especially if the hydroxyalkyl group is bound to an oxygen or a nitrogen atom. Thus, preferred examples of $C_2$-$C_4$-hydroxyalkyl are 2-hydroxyethyl, 2-hydroxypropyl, 3-hydroxypropyl, 2-hydroxy-1-methylethyl, 2-hydroxybutyl, 3-hydroxybutyl, 4-hydroxybutyl, 2-hydroxy-1-methylpropyl, 3-hydroxy-1-methylpropyl, 1-(hydroxymethyl)-propyl, 2-hydroxy-2-methylpropyl, 3-hydroxy-2-methylpropyl, 2-(hydroxymethyl)-propyl, and 1-(hydroxymethyl)-2-methyl-ethyl.

If the term "alkenyl" as used herein and in the alkyl moieties of alkenyloxy is used without prefix ($C_n$-$C_m$), it indicates monounsaturated (i.e. containing one C—C double bond) straight-chain or branched aliphatic hydrocarbon radicals having in general 2 to 20 ("$C_2$-$C_{20}$-alkenyl") carbon atoms, in particular 2 to 10 ("$C_2$-$C_{10}$-alkenyl") carbon atoms, specifically 2 to 6 ("$C_2$-$C_6$-alkenyl") or 2 to 4 ("$C_2$-$C_4$-alkenyl") carbon atoms, where the C—C double bond can be in any position. "$C_2$-$C_3$-alkenyl" refers to monounsaturated straight-chain or branched aliphatic hydrocarbon radicals having 2 to 3 carbon atoms and a C—C double bond in any position. "$C_2$-$C_4$-alkenyl" refers to monounsaturated straight-chain or branched aliphatic hydrocarbon radicals having 2 to 4 carbon atoms and a C—C double bond in any position. "$C_2$-$C_6$-alkenyl" refers to monounsaturated straight-chain or branched aliphatic hydrocarbon radicals having 2 to 6 carbon atoms and a C—C double bond in any position. "$C_2$-$C_8$-alkenyl" refers to monounsaturated straight-chain or branched aliphatic hydrocarbon radicals having 2 to 8 carbon atoms and a C—C double bond in any position. "$C_2$-$C_{10}$-alkenyl" refers to monounsaturated straight-chain or branched aliphatic hydrocarbon radicals having 2 to 10 carbon atoms and a C—C double bond in any position. "$C_2$-$C_{20}$-alkenyl" refers to monounsaturated straight-chain or branched aliphatic hydrocarbon radicals having 2 to 20 carbon atoms and a C—C double bond in any position. Examples for $C_2$-$C_3$-alkenyl are ethenyl, 1-propenyl, 2-propenyl or 1-methylethenyl. Examples for $C_2$-$C_4$-alkenyl are ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl or 2-methyl-2-propenyl. Examples for $C_2$-$C_6$-alkenyl are ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl and the like. Examples for $C_2$-$C_{10}$-alkenyl are, in addition to the examples mentioned for $C_2$-$C_6$-alkenyl, 1-heptenyl, 2-heptenyl, 3-heptenyl, 1-octenyl, 2-octenyl, 3-octenyl, 4-octenyl, 1-nonenyl, 2-nonenyl, 3-nonenyl, 4-nonenyl, 1-decenyl, 2-decenyl, 3-decenyl, 4-decenyl, 5-decenyl and the positional isomers thereof.

If the term "alkynyl" as used herein and in the alkynyl moieties of alkynyloxy is used without prefix ($C_n$-$C_m$), it indicates straight-chain or branched aliphatic hydrocarbon radicals having in general 2 to 20 ("$C_2$-$C_{20}$-alkynyl") carbon atoms, in particular 2 to 10 ("$C_2$-$C_{10}$-alkynyl") carbon atoms, specifically 2 to 6 ("$C_2$-$C_6$-alkynyl") or 2 to 4 ("$C_2$-$C_4$-alkynyl") carbon atoms, and one triple bond in any position. "$C_2$-$C_3$-Alkynyl" indicates straight-chain or branched hydrocarbon radicals having 2 to 3 carbon atoms and one triple bond in any position. "$C_2$-$C_4$-Alkynyl" indicates straight-chain or branched hydrocarbon radicals having 2 to 4 carbon atoms and one triple bond in any position. "$C_2$-$C_6$-Alkynyl" indicates straight-chain or branched hydrocarbon radicals having 2 to 6 carbon atoms and one triple bond in any position. "$C_2$-$C_8$-Alkynyl" indicates straight-chain or branched hydrocarbon radicals having 2 to 8 carbon atoms and one triple bond in any position. "$C_2$-$C_{10}$-Alkynyl" indicates straight-chain or branched hydrocarbon radicals having 2 to 10 carbon atoms and one triple bond in any position. "$C_2$-$C_{20}$-Alkynyl" indicates straight-chain or branched hydrocarbon radicals having 2 to 20 carbon atoms and one triple bond in any position. Examples for $C_2$-$C_3$-alkynyl are ethynyl, 1-propynyl or 2-propynyl. Examples for $C_2$-$C_4$-alkynyl are ethynyl, 1-propynyl, 2-propynyl, 1-butynyl, 2-butynyl, 3-butynyl, 1-methyl-2-propynyl and the like. Examples for $C_2$-$C_6$-alkynyl are ethynyl, 1-propynyl, 2-propynyl, 1-butynyl, 2-butynyl, 3-butynyl, 1-methyl-2-propynyl, 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, 1-ethyl-1-methyl-2-propynyl and the like.

The term "cycloalkyl" as used herein refers to monocyclic saturated hydrocarbon radicals having 3 to 6 carbon atoms ("$C_3$-$C_6$-cycloalkyl"). Examples of $C_3$-$C_6$-cycloalkyl are cyclopropyl, cyclobutyl, cyclopentyl and cyclohexyl.

The term "alkoxy" denotes an alkyl group, as mentioned above, bound to the remainder of a molecule via an oxygen atom. If the term "alkoxy" is used without prefix ($C_n$-$C_m$), it relates to $C_1$-$C_{20}$-alkoxy. "$C_1$-$C_2$-Alkoxy" is a $C_1$-$C_2$-alkyl group, as defined above, attached via an oxygen atom to the remainder of the molecule. "$C_1$-$C_3$-Alkoxy" is a $C_1$-$C_3$-alkyl group, as defined above, attached via an oxygen atom to the remainder of the molecule. "$C_1$-$C_4$-Alkoxy" is a $C_1$-$C_4$-alkyl group, as defined above, attached via an oxygen atom to the remainder of the molecule. "$C_1$-$C_6$-Alkoxy" is a $C_1$-$C_6$-alkyl group, as defined above, attached via an oxygen atom to the remainder of the molecule. "$C_1$-$C_{10}$-Alkoxy" is a $C_1$-$C_{10}$-alkyl group, as defined above, attached via an oxygen atom to the remainder of the molecule. "$C_1$-$C_{12}$-Alkoxy" is a $C_1$-$C_{12}$-alkyl group, as defined above, attached via an oxygen atom to the remainder of the molecule. "$C_1$-$C_{20}$-Alkoxy" is a $C_1$-$C_{20}$-alkyl group attached via an oxygen atom to the remainder of the molecule. $C_1$-$C_2$-Alkoxy is methoxy or ethoxy. Examples for $C_1$-$C_3$-alkoxy are, in addition to those mentioned for $C_1$-$C_2$-alkoxy, n-propoxy and 1-methylethoxy (isopropoxy). Examples for $C_1$-$C_4$-alkoxy are, in addition to those mentioned for $C_1$-$C_3$-alkoxy, butoxy, 1-methylpropoxy (sec-butoxy), 2-methylpropoxy (isobutoxy) or 1,1-dimethylethoxy (tert-butoxy). Examples for $C_1$-$C_6$-alkoxy are, in addition to those mentioned for $C_1$-$C_4$-alkoxy, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy. Examples for $C_1$-$C_{10}$-alkoxy are, in addition to those mentioned for $C_1$-$C_6$-alkoxy, heptyloxy, octyloxy, 2-ethylhexyloxy, nonyloxy, decyloxy, and positional isomers thereof. Examples for $C_1$-$C_{12}$-alkoxy are, in addition to those mentioned for $C_1$-$C_{10}$-alkoxy, undecyloxy, dodecyloxy, and positional isomers thereof. Examples for $C_1$-$C_{20}$-alkoxy are, in addition to those mentioned for $C_1$-$C_{12}$-alkoxy, tridecyloxy, tetradecyloxy, pentadecyloxy, hexadecyloxy, heptadecyloxy, octadecyloxy, nonadecyloxy, eicosanyloxy, and positional isomers thereof.

The term "alkenyloxy" refers to an alkenyl group, as defined above, attached via an oxygen atom to the remainder of the molecule. If the term "alkenyloxy" is used without prefix ($C_n$-$C_m$), it relates to $C_2$-$C_{20}$-alkenyloxy. Examples for $C_2$-$C_3$-alkenyloxy are ethenyloxy, 1-propenyloxy, 2-propenyloxy or 1-methylethenyloxy. Examples for $C_2$-$C_4$-alkenyloxy are ethenyloxy, 1-propenyloxy, 2-propenyloxy, 1-methylethenyloxy, 1-butenyloxy, 2-butenyloxy, 3-butenyloxy, 1-methyl-1-propenyloxy, 2-methyl-1-propenyloxy, 1-methyl-2-propenyloxy or 2-methyl-2-propenyloxy. Examples for $C_2$-$C_6$-alkenyloxy are, in addition to those mentioned for $C_2$-$C_6$-alkenyloxy, 1-pentenyloxy, 2-pentenyloxy, 3-pentenyloxy, 4-pentenyloxy, 1-methyl-1-butenyloxy, 2-methyl-1-butenyloxy, 3-methyl-1-butenyloxy, 1-methyl-2-butenyloxy, 2-methyl-2-butenyloxy, 3-methyl-2-butenyloxy, 1-methyl-3-butenyloxy, 2-methyl-3-butenyloxy, 3-methyl-3-butenyloxy, 1,1-dimethyl-2-propenyloxy, 1,2-dimethyl-1-propenyloxy, 1,2-dimethyl-2-propenyloxy, 1-ethyl-1-propenyloxy, 1-ethyl-2-propenyloxy, 1-hexenyloxy, 2-hexenyloxy, 3-hexenyloxy, 4-hexenyloxy, 5-hexenyloxy, 1-methyl-1-pentenyloxy, 2-methyl-1-pentenyloxy, 3-methyl-1-pentenyloxy, 4-methyl-1-pentenyloxy, 1-methyl-2-pentenyloxy, 2-methyl-2-pentenyloxy, 3-methyl-2-pentenyloxy, 4-methyl-2-pentenyloxy, 1-methyl-3-pentenyloxy, 2-methyl-3-pentenyloxy, 3-methyl-3-pentenyloxy, 4-methyl-3-pentenyloxy, 1-methyl-4-pentenyloxy, 2-methyl-4-pentenyloxy, 3-methyl-4-pentenyloxy, 4-methyl-4-pentenyloxy, 1,1-dimethyl-2-butenyloxy, 1,1-dimethyl-3-butenyloxy, 1,2-dimethyl-1-butenyloxy, 1,2-dimethyl-2-butenyloxy, 1,2-dimethyl-3-butenyloxy, 1,3-dimethyl-1-butenyloxy, 1,3-dimethyl-2-butenyloxy, 1,3-dimethyl-3-butenyloxy, 2,2-dimethyl-3-butenyloxy, 2,3-dimethyl-1-butenyloxy, 2,3-dimethyl-2-butenyloxy, 2,3-dimethyl-3-butenyloxy, 3,3-dimethyl-1-butenyloxy, 3,3-dimethyl-2-butenyloxy, 1-ethyl-1-butenyloxy, 1-ethyl-2-butenyloxy, 1-ethyl-3-butenyloxy, 2-ethyl-1-butenyloxy, 2-ethyl-2-butenyloxy, 2-ethyl-3-butenyloxy, 1,1,2-trimethyl-2-propenyloxy, 1-ethyl-1-methyl-2-propenyloxy, 1-ethyl-2-methyl-1-propenyloxy, 1-ethyl-2-methyl-2-propenyloxy and the like. Examples for $C_2$-$C_{10}$-alkenyloxy are, in addition to the examples mentioned for $C_2$-$C_6$-alkenyloxy, 1-heptenyloxy, 2-heptenyloxy, 3-heptenyloxy, 1-octenyloxy, 2-octenyloxy, 3-octenyloxy, 4-octenyloxy, 1-nonenyloxy, 2-nonenyloxy, 3-nonenyloxy, 4-nonenyloxy, 1-decenyloxy, 2-decenyloxy, 3-decenyloxy, 4-decenyloxy, 5-decenyloxy and the positional isomers thereof.

The term "alkynyloxy" refers to an alkynyl group, as defined above, attached via an oxygen atom to the remainder of the molecule. If the term "alkynyloxy" is used without prefix ($C_n$-$C_m$), it it relates to $C_2$-$C_{20}$-alkynyloxy. Examples for $C_2$-$C_3$-alkynyloxy are ethynyloxy, 1-propynyloxy or 2-propynyloxy. Examples for $C_2$-$C_4$-alkynyl are ethynyloxy, 1-propynyloxy, 2-propynyloxy, 1-butynyloxyoxy, 2-butynyl, 3-butynyloxy, 1-methyl-2-propynyloxy and the like. Examples for $C_2$-$C_6$-alkynyloxy are, in addition to those mentioned for $C_2$-$C_6$-alkenyloxy, 1-pentynyloxy, 2-pentynyloxy, 3-pentynyloxy, 4-pentynyloxy, 1-methyl-2-butynyloxy, 1-methyl-3-butynyloxy, 2-methyl-3-butynyloxy, 3-methyl-1-butynyloxy, 1,1-dimethyl-2-propynyloxy, 1-ethyl-2-propynyloxy, 1-hexynyloxy, 2-hexynyloxy, 3-hexynyloxy, 4-hexynyloxy, 5-hexynyloxy, 1-methyl-2-pentynyloxy, 1-methyl-3-pentynyloxy, 1-methyl-4-pentynyloxy, 2-methyl-3-pentynyloxy, 2-methyl-4-pentynyloxy, 3-methyl-1-pentynyloxy, 3-methyl-4-pentynyloxy, 4-methyl-1-pentynyloxy, 4-methyl-2-pentynyloxy, 1,1-dimethyl-2-butynyloxy, 1,1-dimethyl-3-butynyloxy, 1,2-dimethyl-3-butynyloxy, 2,2-dimethyl-3-butynyloxy, 3,3-dimethyl-1-butynyloxy, 1-ethyl-2-butynyloxy, 1-ethyl-3-butynyloxy, 2-ethyl-3-butynyloxy, 1-ethyl-1-methyl-2-propynyloxy and the like.

The term "cycloalkoxy" refers to a cycloalkyl group, as defined above, attached via an oxygen atom to the remainder of the molecule. If the term "cycloalkoxy" is used without prefix ($C_n$-$C_m$), it relates to $C_3$-$C_6$-cycloalkoxy. Examples of $C_3$-$C_6$-cycloalkoxy are cyclopropoxy, cyclobutoxy, cyclopentoxy and cyclohexoxy.

The term "alkylthio" refers to alkyl groups, as defined above, attached via a sulfur atom to the remainder of the molecule. $C_1$-$C_4$-Alkylthio is for example methylthio, ethylthio, n-propylthio, 1-methylethylthio (isopropylthio), butylthio, 1-methylpropylthio (sec-butylthio), 2-methylpropylthio (isobutylthio) or 1,1-dimethylethylthio (tert-butylthio). Examples for $C_1$-$C_6$-alkylthio are, in addition to those mentioned for $C_1$-$C_4$-alkylthio, pentylthio, 1-methylbutylthio, 2-methylbutylthio, 3-methylbutylthio, 1,1-dimethylpropylthio, 1,2-dimethylpropylthio, 2,2-dimethylpropylthio, 1-ethylpropylthio, hexylthio, 1-methylpentylthio, 2-methylpentylthio, 3-methylpentylthio, 4-methylpentylthio, 1,1-dimethylbutylthio, 1,2-dimethylbutylthio, 1,3-dimethylbutylthio, 2,2-dimethylbutylthio, 2,3-dimethylbutylthio, 3,3-dimethylbutylthio, 1-ethylbutylthio, 2-ethylbutylthio, 1,1,2-trimethylpropylthio, 1,2,2-trimethylpropylthio, 1-ethyl-1-methylpropylthio or 1-ethyl-2-methylpropylthio. Examples for $C_1$-$C_{10}$-alkylthio are, in addition to those mentioned for $C_1$-$C_6$-alkylthio, heptylthio, octlythio, nonylthio, decylthio and the positional isomers thereof.

The term "alkylsulfinyl" refers to alkyl groups, as defined above, attached via a sulfinyl group [S(=O)] to the remainder of the molecule. $C_1$-$C_4$-Alkylsulfinyl is for example methylsulfinyl, ethylsulfinyl, n-propylsulfinyl, 1-methylethylsulfinyl (isopropylsulfinyl), butylsulfinyl, 1-methylpropylsulfinyl (sec-butylsulfinyl), 2-methylpropylsulfinyl (isobutylsulfinyl) or 1,1-dimethylethylsulfinyl (tert-butylsulfinyl). Examples for $C_1$-$C_6$-alkylsulfinyl are, in addition to those mentioned for $C_1$-$C_4$-alkylsulfinyl, pentylsulfinyl, 1-methylbutylsulfinyl, 2-methylbutylsulfinyl, 3-methylbutylsulfinyl, 1,1-dimethylpropylsulfinyl, 1,2-dimethylpropylsulfinyl, 2,2-dimethylpropylsulfinyl, 1-ethylpropylsulfinyl, hexylsulfinyl, 1-methylpentylsulfinyl, 2-methylpentylsulfinyl, 3-methylpentylsulfinyl, 4-methylpentylsulfinyl, 1,1-dimethylbutylsulfinyl, 1,2-dimethylbutylsulfinyl, 1,3-dimethylbutylsulfinyl, 2,2-dimethylbutylsulfinyl, 2,3-dimethylbutylsulfinyl, 3,3-dimethylbutylsulfinyl, 1-ethylbutylsulfinyl, 2-ethylbutylsulfinyl, 1,1,2-trimethylpropylsulfinyl, 1,2,2-trimethylpropylsulfinyl, 1-ethyl-1-methylpropylsulfinyl or 1-ethyl-2-methylpropylsulfinyl.

The term "alkylsulfonyl" refers to alkyl groups, as defined above, attached via a sulfonyl group [S(=O)$_2$] to the remainder of the molecule. "$C_1$-$C_2$-Alkylsulfonyl" is a $C_1$-$C_2$-alkyl group, as defined above, attached via a sulfonyl group to the remainder of the molecule. "$C_1$-$C_3$-Alkylsulfonyl" is a $C_1$-$C_3$-alkyl group, as defined above, attached via a sulfonyl group to the remainder of the molecule. "$C_1$-$C_4$-Alkylsulfonyl" is a $C_1$-$C_4$-alkyl group, as defined above, attached via a sulfonyl group to the remainder of the molecule. "$C_1$-$C_6$-Alkylsulfonyl" is a $C_1$-$C_6$-alkyl group, as defined above, attached via a sulfonyl group to the remainder of the molecule. $C_1$-$C_2$-Alkylsulfonyl is methylsulfonyl or ethylsulfonyl. Examples for $C_1$-$C_3$-alkylsulfonyl are, in addition to those mentioned for $C_1$-$C_2$-alkylsulfonyl, n-propylsulfonyl and 1-methylethylsulfonyl (isopropylsulfonyl). Examples for $C_1$-$C_4$-alkylsulfonyl are, in addition to those mentioned for $C_1$-$C_3$-alkylsulfonyl, butylsulfonyl, 1-methylpropylsulfonyl (sec-butylsulfonyl), 2-methylpropylsulfonyl (isobutylsulfonyl) or 1,1-dimethylethylsulfonyl (tert-butylsulfonyl). Examples for $C_1$-$C_6$-alkylsulfonyl are, in addition to those mentioned for $C_1$-$C_4$-alkylsulfonyl, pentylsulfonyl, 1-methylbutylsulfonyl, 2-methylbutylsulfonyl, 3-methylbutylsulfonyl, 1,1-dimethylpropylsulfonyl, 1,2-dimethylpropylsulfonyl, 2,2-dimethylpropylsulfonyl, 1-ethylpropylsulfonyl, hexylsulfonyl, 1-methylpentylsulfonyl, 2-methylpentylsulfonyl, 3-methylpentylsulfonyl, 4-methylpentylsulfonyl, 1,1-dimethylbutylsulfonyl, 1,2-dimethylbutylsulfonyl, 1,3-dimethylbutylsulfonyl, 2,2-dimethylbutylsulfonyl, 2,3-dimethylbutylsulfonyl, 3,3-dimethylbutylsulfonyl, 1-ethylbutylsulfonyl, 2-ethylbutylsulfonyl, 1,1,2-trimethylpropylsulfonyl, 1,2,2-trimethylpropylsulfonyl, 1-ethyl-1-methylpropylsulfonyl or 1-ethyl-2-methylpropylsulfonyl.

The term "alkylcarbonyl" refers to alkyl groups, as defined above, attached via a carbonyl group [C(=O)] to the remainder of the molecule. $C_1$-$C_4$-Alkylcarbonyl is for example methylcarbonyl, ethylcarbonyl, n-propylcarbonyl, 1-methylethylcarbonyl (isopropylcarbonyl), butylcarbonyl, 1-methylpropylcarbonyl (sec-butylcarbonyl), 2-methylpropylcarbonyl (isobutylcarbonyl) or 1,1-dimethylethylcarbonyl (tert-butylcarbonyl). Examples for $C_1$-$C_6$-alkylcarbonyl are, in addition to those mentioned for $C_1$-$C_4$-alkylcarbonyl, pentylcarbonyl, 1-methylbutylcarbonyl, 2-methylbutylcarbonyl, 3-methylbutylcarbonyl, 1,1-dimethylpropylcarbonyl, 1,2-dimethylpropylcarbonyl, 2,2-dimethylpropylcarbonyl, 1-ethylpropylcarbonyl, hexylcarbonyl, 1-methylpentylcarbonyl, 2-methylpentylcarbonyl, 3-methylpentylcarbonyl, 4-methylpentylcarbonyl, 1,1-dimethylbutylcarbonyl, 1,2-dimethylbutylcarbonyl, 1,3-dimethylbutylcarbonyl, 2,2-dimethylbutylcarbonyl, 2,3-dimethylbutylcarbonyl, 3,3-dimethylbutylcarbonyl, 1-ethylbutylcarbonyl, 2-ethylbutylcarbonyl, 1,1,2-trimethylpropylcarbonyl, 1,2,2-trimethylpropylcarbonyl, 1-ethyl-1-methylpropylcarbonyl or 1-ethyl-2-methylpropylcarbonyl.

The term "alkoxycarbonyl" refers to alkoxy groups, as defined above, attached via a carbonyl group [C(=O)] to the remainder of the molecule. $C_1$-$C_4$-Alkoxycarbonyl is for example methoxycarbonyl, ethoxycarbonyl, n-propoxycarbonyl, 1-methylethoxycarbonyl (isopropoxycarbonyl), butoxycarbonyl, 1-methylpropoxycarbonyl (sec-butoxycarbonyl), 2-methylpropoxycarbonyl (isobutoxycarbonyl) or 1,1-dimethylethoxycarbonyl (tert-butoxycarbonyl). Examples for $C_1$-$C_6$-alkoxycarbonyl are, in addition to those mentioned for $C_1$-$C_4$-alkoxycarbonyl, pentoxycarbonyl, 1-methylbutoxycarbonyl, 2-methylbutoxycarbonyl, 3-methylbutoxycarbonyl, 1,1-dimethylpropoxycarbonyl, 1,2-dimethylpropoxycarbonyl, 2,2-dimethylpropoxycarbonyl, 1-ethylpropoxycarbonyl, hexoxycarbonyl, 1-methylpentoxycarbonyl, 2-methylpentoxycarbonyl, 3-methylpentoxycarbonyl, 4-methylpentoxycarbonyl, 1,1-dimethylbutoxycarbonyl, 1,2-dimethylbutoxycarbonyl, 1,3-dimethylbutoxycarbonyl, 2,2-dimethylbutoxycarbonyl, 2,3-dimethylbutoxycarbonyl, 3,3-dimethylbutoxycarbonyl, 1-ethylbutoxycarbonyl, 2-ethylbutoxycarbonyl, 1,1,2-trimethylpropoxycarbonyl, 1,2,2-trimethylpropoxycarbonyl, 1-ethyl-1-methylpropoxycarbonyl or 1-ethyl-2-methylpropoxycarbonyl. Examples for $C_1$-$C_{10}$-alkoxycarbonyl are, in addition to those mentioned for $C_1$-$C_6$-alkoxycarbonyl, heptoxycarbonyl, octyloxycarbonyl, nonyloxycarbonyl, decyloxycarbonyl and the positional isomers thereof.

"Amino" is —NH$_2$.

"C$_1$-C$_4$-alkylamino" is a group —N(H)—C$_1$-C$_4$-alkyl, where C$_1$-C$_4$-alkyl is as defined above Examples are methylamino, ethylamino, propylamino, isopropylamino, butylamino and the like.

The term "di(C$_1$-C$_4$-alkyl)amino" denotes a group —N(C$_1$-C$_4$-alkyl)$_2$, where each C$_1$-C$_4$-alkyl is independently as defined above. Examples are dimethylamino, diethylamino, ethylmethylamino, dipropylamino, diisopropylamino, methylpropylamino, methylisopropylamino, ethylpropylamino, ethylisopropylamino, dibutylamino and the like.

Alkenylene is a linear or branched divalent alkenediyl radical, e.g. C$_2$-C$_4$-alkenylene, which is in turn a linear or branched divalent alkenyl radical having 2, 3 or 4 carbon atoms. Examples are —CH=CH—, —CH=CH—CH$_2$—, —CH$_2$—CH=CH—, —CH=CH—CH$_2$—CH$_2$—, —CH$_2$—CH=CH—CH$_2$—, and —CH$_2$—CH$_2$—CH=CH—.

Alkynylene is a linear or branched divalent alkynediyl radical, e.g. C$_2$-C$_4$-alkynylene, which is in turn a linear or branched divalent alkynyl radical having 2, 3 or 4 carbon atoms. Examples are —C≡C—, —C≡C—CH$_2$—, —CH$_2$—C≡C—, —C≡C—CH$_2$—CH$_2$—, —CH$_2$—C≡C—CH$_2$—, and —CH$_2$—CH$_2$—C≡C—.

Divalent aliphatic radicals (also termed aliphatic diradicals) are radicals which contain no cycloaliphatic, aromatic or heterocyclic constituents. Examples are alkylene, alkenylene, and alkynylene radicals.

Divalent cycloaliphatic radicals (also termed cycloaliphatic diradicals) may contain one or more, e.g., one or two, cycloaliphatic radicals; however, they contain no aromatic or heterocyclic constituents. The cycloaliphatic radicals may be substituted by aliphatic radicals, but bonding sites to the remainder of the molecule are located on the cycloaliphatic radical.

Divalent aliphatic-cycloaliphatic radicals (also termed aliphatic-cycloaliphatic diradicals) contain not only at least one divalent aliphatic radical but also at least one divalent cycloaliphatic radical, the two bonding sites to the remainder of the molecule being located either both on the cycloaliphatic radical(s) or both on the aliphatic radical(s) or one on an aliphatic radical and the other on a cycloaliphatic radical.

Divalent aromatic radicals (also termed aromatic diradicals) may contain one or more, e.g., one or two, aromatic radicals; however, they contain no cycloaliphatic or heterocyclic constituents. The aromatic radicals may be substituted by aliphatic radicals, but both bonding sites to the remainder of the molecule are located on the aromatic radical(s).

Divalent araliphatic radicals (also termed araliphatic diradicals) contain not only at least one divalent aliphatic radical but also at least one divalent aromatic radical, the two bonding sites to the remainder of the molecule being located either both on the aromatic radical(s) or both on the aliphatic radical(s) or one on an aliphatic radical and the other on an aromatic radical.

Alkylene is a linear or branched divalent alkanediyl radical. C$_1$-C$_3$-Alkylene is a linear or branched divalent alkyl radical having 1, 2 or 3 carbon atoms. Examples are —CH$_2$—, —CH$_2$CH$_2$—, —CH(CH$_3$)—, —CH$_2$CH$_2$CH$_2$—, —CH(CH$_3$)CH$_2$—, —CH$_2$CH(CH$_3$)— and —C(CH$_3$)$_2$—. C$_3$-Alkylene is a linear or branched divalent alkyl radical having 3 carbon atoms. Examples are —CH$_2$CH$_2$CH$_2$—, —CH(CH$_3$)CH$_2$—, —CH$_2$CH(CH$_3$)— and —C(CH$_3$)$_2$—. C$_1$-C$_4$-Alkylene is a linear or branched divalent alkyl radical having 1, 2, 3 or 4 carbon atoms. Examples are —CH$_2$—, —CH$_2$CH$_2$—, —CH(CH$_3$)—, —CH$_2$CH$_2$CH$_2$—, —CH(CH$_3$)CH$_2$—, —CH$_2$CH(CH$_3$)—, —C(CH$_3$)$_2$—, —CH$_2$CH$_2$CH$_2$CH$_2$—, —CH(CH$_3$)CH$_2$CH$_2$—, —CH$_2$CH$_2$CH(CH$_3$)—, —C(CH$_3$)$_2$CH$_2$—, and —CH$_2$C(CH$_3$)$_2$—. Linear or branched C$_2$-C$_4$-alkylene is a linear or branched divalent alkyl radical having 2, 3 or 4 carbon atoms. Examples are —CH$_2$CH$_2$—, —CH(CH$_3$)—, —CH$_2$CH$_2$CH$_2$—, —CH(CH$_3$)CH$_2$—, —CH$_2$CH(CH$_3$)—, —C(CH$_3$)$_2$—, —CH$_2$CH$_2$CH$_2$CH$_2$—, —CH(CH$_3$)CH$_2$CH$_2$—, —CH$_2$CH$_2$CH(CH$_3$)—, —C(CH$_3$)$_2$CH$_2$— and —CH$_2$C(CH$_3$)$_2$—. Linear or branched C$_2$-C$_{10}$-alkylene is a linear or branched divalent alkyl radical having 2, 3, 4, 5, 6, 7, 8, 9 or 10 carbon atoms. Examples, in addition to the radicals stated above for C$_2$-C$_4$-alkylene, are —(CH$_2$)$_5$—, —(CH$_2$)$_6$—, —(CH$_2$)$_7$—, —(CH$_2$)$_8$—, —(CH$_2$)$_9$—, —(CH$_2$)$_{10}$— and positional isomers thereof. Linear or branched C$_1$-C$_{10}$-alkylene is a linear or branched divalent alkyl radical having 1, 2, 3, 4, 5, 6, 7, 8, 9 or 10 carbon atoms. One example, in addition to the radicals stated above for C$_2$-C$_{10}$-alkylene, is methylene (—CH$_2$—). Linear or branched C$_6$-C$_{10}$-alkylene is a linear or branched divalent alkyl radical having 6, 7, 8, 9 or 10 carbon atoms. Examples are —(CH$_2$)$_6$—, —(CH$_2$)$_7$—, —(CH$_2$)$_8$—, —(CH$_2$)$_9$—, —(CH$_2$)$_{10}$— and positional isomers thereof.

Alkanols are compounds of formula R—OH in which R is a linear or branched alkyl group. If not mentioned otherwise, R is preferably C$_1$-C$_{16}$-alkyl (R—OH is thus preferably C$_1$-C$_{16}$-alkanol). C$_1$-C$_4$-alkanols are compounds R—OH in which R is a linear or branched C$_1$-C$_4$-alkyl group. C$_1$-C$_6$-alkanols are compounds R—OH in which R is a linear or branched C$_1$-C$_6$-alkyl group. Examples for C$_1$-C$_4$-alkanols are methanol, ethanol, n-propanol, isopropanol, n-butanol, sec-butanol, isobutanol and tert-butanol. Examples for C$_1$-C$_6$-alkanols are, in addition to those mentioned for C$_1$-C$_4$-alkanols, 1-pentanol, 2-pentanol, 3-pentanol, 1-hexanol, 2-hexanol, 3-hexanol and the isomers thereof. Examples for C$_1$-C$_{16}$-alkanols are, in addition to those mentioned for C$_1$-C$_6$-alkanols, linear heptanol, octanol, nonanol, decanol, undecanol, dodecanol, tridecanol, tetradecanol, pentadecanol, hexadecanol and their isomers.

Alkanediols are compounds of formula HO-A-OH in which A is a linear or branched alkylene group, i.e. a divalent linear or branched alkanediyl radical. C$_2$-C$_4$-alkanediols are compounds of formula HO-A-OH in which A is a linear or branched C$_2$-C$_4$-alkylene group. Examples are 1,2-ethanediol (ethylene glycol), 1,2-propanediol (propylene glycol), 1,3-propanediol, 1,2-butanediol, 1,3-butanediol and 1,4-butanediol.

Cycloalkanols are compounds of formula R—OH in which R is a cycloalkyl group. If not mentioned otherwise, R is preferably C$_3$-C$_6$-cycloalkyl (R—OH is thus preferably a C$_3$-C$_6$-cycloalkanol). The cycloalkyl ring may carry further substituents.

Cycloalkanediols are cycloalkyl rings which carry two OH groups. If not mentioned otherwise, the cycloalkyl ring is preferably C$_3$-C$_6$-cycloalkyl. The cycloalkyl ring may carry further substituents.

Polyetherpolyols are polyethers, generally derived from polymerized alkyleneoxides, and having at least two OH groups. Polyethermonools are polyethers, generally derived from polymerized alkyleneoxides, and having one OH group.

A hydroxyaromatic compound is an aromatic compound carrying one or more OH groups. Examples are phenol, the kresols, catechol, resorcinol, hydroquinone, 1- or 2-naphthol and the like.

A formyl group is a group —CHO (—C(=O)H).

A keto group is a group (—C(=O)R, where R is an organic radical.

A thioketo group is a group (—C(=S)R, where R is an organic radical.

The term "3-, 4-, 5-, 6- or 7-membered saturated, partially unsaturated or maximally unsaturated heterocyclic ring containing 1, 2 or 3 heteroatoms or heteroatom groups selected from N, O, S, NO, SO and SO$_2$, as ring members" [wherein "maximum unsaturated" includes also "aromatic" ] as used herein denotes monocyclic radicals, the monocyclic radicals being saturated, partially unsaturated or maximum unsaturated (including aromatic).

Unsaturated rings contain at least one C—C and/or C—N and/or N—N double bond(s). Maximally unsaturated rings contain as many conjugated C—C and/or C—N and/or N—N double bonds as allowed by the ring size. Maximally unsaturated 5- or 6-membered heteromonocyclic rings are generally aromatic. Exceptions are maximally unsaturated 6-membered rings containing O, S, SO and/or SO$_2$ as ring members, such as pyran and thiopyran, which are not aromatic. Partially unsaturated rings contain less than the maximum number of C—C and/or C—N and/or N—N double bond(s) allowed by the ring size. The heterocyclic ring may be attached to the remainder of the molecule via a carbon ring member or via a nitrogen ring member. As a matter of course, the heterocyclic ring contains at least one carbon ring atom. If the ring contains more than one O ring atom, these are not adjacent.

Examples of a 3-, 4-, 5-, 6- or 7-membered saturated heteromonocyclic ring include: Oxiran-2-yl, thiiran-2-yl, aziridin-1-yl, aziridin-2-yl, oxetan-2-yl, oxetan-3-yl, thietan-2-yl, thietan-3-yl, 1-oxothietan-2-yl, 1-oxothietan-3-yl, 1,1-dioxothietan-2-yl, 1,1-dioxothietan-3-yl, azetidin-1-yl, azetidin-2-yl, azetidin-3-yl, tetrahydrofuran-2-yl, tetrahydrofuran-3-yl, tetrahydrothien-2-yl, tetrahydrothien-3-yl, 1-oxotetrahydrothien-2-yl, 1,1-dioxotetrahydrothien-2-yl, 1-oxotetrahydrothien-3-yl, 1,1-dioxotetrahydrothien-3-yl, pyrrolidin-1-yl, pyrrolidin-2-yl, pyrrolidin-3-yl, pyrazolidin-1-yl, pyrazolidin-3-yl, pyrazolidin-4-yl, pyrazolidin-5-yl, imidazolidin-1-yl, imidazolidin-2-yl, imidazolidin-4-yl, oxazolidin-2-yl, oxazolidin-3-yl, oxazolidin-4-yl, oxazolidin-5-yl, isoxazolidin-2-yl, isoxazolidin-3-yl, isoxazolidin-4-yl, isoxazolidin-5-yl, thiazolidin-2-yl, thiazolidin-3-yl, thiazolidin-4-yl, thiazolidin-5-yl, isothiazolidin-2-yl, isothiazolidin-3-yl, isothiazolidin-4-yl, isothiazolidin-5-yl, 1,2,4-oxadiazolidin-2-yl, 1,2,4-oxadiazolidin-3-yl, 1,2,4-oxadiazolidin-4-yl, 1,2,4-oxadiazolidin-5-yl, 1,2,4-thiadiazolidin-2-yl, 1,2,4-thiadiazolidin-3-yl, 1,2,4-thiadiazolidin-4-yl, 1,2,4-thiadiazolidin-5-yl, 1,2,4-triazolidin-1-yl, 1,2,4-triazolidin-3-yl, 1,2,4-triazolidin-4-yl, 1,3,4-oxadiazolidin-2-yl, 1,3,4-oxadiazolidin-3-yl, 1,3,4-thiadiazolidin-2-yl, 1,3,4-thiadiazolidin-3-yl, 1,3,4-triazolidin-1-yl, 1,3,4-triazolidin-2-yl, 1,3,4-triazolidin-3-yl, tetrahydropyran-2-yl, tetrahydropyran-3-yl, tetrahydropyran-4-yl, 1,3-dioxan-2-yl, 1,3-dioxan-4-yl, 1,3-dioxan-5-yl, 1,4-dioxan-2-yl, piperidin-1-yl, piperidin-2-yl, piperidin-3-yl, piperidin-4-yl, hexahydropyridazin-1-yl, hexahydropyridazin-3-yl, hexahydropyridazin-4-yl, hexahydropyrimidin-1-yl, hexahydropyrimidin-2-yl, hexahydropyrimidin-4-yl, hexahydropyrimidin-5-yl, piperazin-1-yl, piperazin-2-yl, 1,3,5-hexahydrotriazin-1-yl, 1,3,5-hexahydrotriazin-2-yl, 1,2,4-hexahydrotriazin-1-yl, 1,2,4-hexahydrotriazin-2-yl, 1,2,4-hexahydrotriazin-3-yl, 1,2,4-hexahydrotriazin-4-yl, 1,2,4-hexahydrotriazin-5-yl, 1,2,4-hexahydrotriazin-6-yl, morpholin-2-yl, morpholin-3-yl, morpholin-4-yl, thiomorpholin-2-yl, thiomorpholin-3-yl, thiomorpholin-4-yl, 1-oxothiomorpholin-2-yl, 1-oxothiomorpholin-3-yl, 1-oxothiomorpholin-4-yl, 1,1-dioxothiomorpholin-2-yl, 1,1-dioxothiomorpholin-3-yl, 1,1-dioxothiomorpholin-4-yl, azepan-1-, -2-, -3- or -4-yl, oxepan-2-, -3-, -4- or -5-yl, hexahydro-1,3-diazepinyl, hexahydro-1,4-diazepinyl, hexahydro-1,3-oxazepinyl, hexahydro-1,4-oxazepinyl, hexahydro-1,3-dioxepinyl, hexahydro-1,4-dioxepinyl, and the like.

Examples of a 3-, 4-, 5-, 6- or 7-membered partially unsaturated heteromonocyclic ring include: 2,3-dihydrofuran-2-yl, 2,3-dihydrofuran-3-yl, 2,4-dihydrofuran-2-yl, 2,4-dihydrofuran-3-yl, 2,3-dihydrothien-2-yl, 2,3-dihydrothien-3-yl, 2,4-dihydrothien-2-yl, 2,4-dihydrothien-3-yl, 2-pyrrolin-2-yl, 2-pyrrolin-3-yl, 3-pyrrolin-2-yl, 3-pyrrolin-3-yl, 2-isoxazolin-3-yl, 3-isoxazolin-3-yl, 4-isoxazolin-3-yl, 2-isoxazolin-4-yl, 3-isoxazolin-4-yl, 4-isoxazolin-4-yl, 2-isoxazolin-5-yl, 3-isoxazolin-5-yl, 4-isoxazolin-5-yl, 2-isothiazolin-3-yl, 3-isothiazolin-3-yl, 4-isothiazolin-3-yl, 2-isothiazolin-4-yl, 3-isothiazolin-4-yl, 4-isothiazolin-4-yl, 2-isothiazolin-5-yl, 3-isothiazolin-5-yl, 4-isothiazolin-5-yl, 2,3-dihydropyrazol-1-yl, 2,3-dihydropyrazol-2-yl, 2,3-dihydropyrazol-3-yl, 2,3-dihydropyrazol-4-yl, 2,3-dihydropyrazol-5-yl, 3,4-dihydropyrazol-1-yl, 3,4-dihydropyrazol-3-yl, 3,4-dihydropyrazol-4-yl, 3,4-dihydropyrazol-5-yl, 4,5-dihydropyrazol-1-yl, 4,5-dihydropyrazol-3-yl, 4,5-dihydropyrazol-4-yl, 4,5-dihydropyrazol-5-yl, 2,3-dihydrooxazol-2-yl, 2,3-dihydrooxazol-3-yl, 2,3-dihydrooxazol-4-yl, 2,3-dihydrooxazol-5-yl, 3,4-dihydrooxazol-2-yl, 3,4-dihydrooxazol-3-yl, 3,4-dihydrooxazol-4-yl, 3,4-dihydrooxazol-5-yl, 3,4-dihydrooxazol-2-yl, 3,4-dihydrooxazol-3-yl, 3,4-dihydrooxazol-4-yl, 2-, 3-, 4-, 5- or 6-di- or tetrahydropyridinyl, 3-di- or tetrahydropyridazinyl, 4-di- or tetrahydropyridazinyl, 2-di- or tetrahydropyrimidinyl, 4-di- or tetrahydropyrimidinyl, 5-di- or tetrahydropyrimidinyl, di- or tetrahydropyrazinyl, 1,3,5-di- or tetrahydrotriazin-2-yl, 1,2,4-di- or tetrahydrotriazin-3-yl, 2,3,4,5-tetrahydro[1H]azepin-1-, -2-, -3-, -4-, -5-, -6- or -7-yl, 3,4,5,6-tetrahydro[2H]azepin-2-, -3-, -4-, -5-, -6- or -7-yl, 2,3,4,7-tetrahydro[1H]azepin-1-, -2-, -3-, -4-, -5-, -6- or -7-yl, 2,3,6,7-tetrahydro[1H]azepin-1-, -2-, -3-, -4-, -5-, -6- or -7-yl, tetrahydrooxepinyl, such as 2,3,4,5-tetrahydro[1H]oxepin-2-, -3-, -4-, -5-, -6- or -7-yl, 2,3,4,7-tetrahydro[1H]oxepin-2-, -3-, -4-, -5-, -6- or -7-yl, 2,3,6,7-tetrahydro[1H]oxepin-2-, -3-, -4-, -5-, -6- or -7-yl, tetrahydro-1,3-diazepinyl, tetrahydro-1,4-diazepinyl, tetrahydro-1,3-oxazepinyl, tetrahydro-1,4-oxazepinyl, tetrahydro-1,3-dioxepinyl, tetrahydro-1,4-dioxepinyl and the like.

Examples of a 3-, 4-, 5-, 6- or 7-membered maximally unsaturated (including aromatic) heteromonocyclic ring are 2-furyl, 3-furyl, 2-thienyl, 3-thienyl, 1-pyrrolyl, 2-pyrrolyl, 3-pyrrolyl, 1-pyrazolyl, 3-pyrazolyl, 4-pyrazolyl, 5-pyrazolyl, 1-imidazolyl, 2-imidazolyl, 4-imidazolyl, 5-imidazolyl, 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,3,4-triazol-1-yl, 1,3,4-triazol-2-yl, 1,3,4-triazol-3-yl, 1,2,3-triazol-1-yl, 1,2,3-triazol-2-yl, 1,2,3-triazol-4-yl, 1,2,5-oxadiazol-3-yl, 1,2,3-oxadiazol-4-yl, 1,2,3-oxadiazol-5-yl, 1,3,4-oxadiazol-2-yl, 1,2,5-thiadiazol-3-yl, 1,2,3-thiadiazol-4-yl, 1,2,3-thiadiazol-5-yl, 1,3,4-thiadiazol-2-yl, 2-pyridinyl, 3-pyridinyl, 4-pyridinyl, 1-oxopyridin-2-yl, 1-oxopyridin-3-yl, 1-oxopyridin-4-yl, 3-pyridazinyl, 4-pyridazinyl, 2-pyrimidinyl, 4-pyrimidinyl, 5-pyrimidinyl, 2-pyrazinyl, 1,3,5-triazin-2-yl, 1,2,4-triazin-3-yl, 1,2,4-triazin-5-yl, 1,2,3,4-tetrazin-1-yl, 1,2,3,4-tetrazin-2-yl, 1,2,3,4-tetrazin-5-yl, pyran-2-yl, pyran-3-yl, pyran-4-yl, thiopyran-2-yl, thiopyran-3-yl, thiopryran-4-yl, 1-oxothiopryran-2-yl, 1-oxothiopryran-3-yl, 1-oxothiopryran-4-yl, 1,1-dioxothiopryran-2-yl, 1,1-dioxothiopryran-3-yl, 1,1-dioxothiopryran-4-yl, 2H-oxazin-2-yl, 2H-oxazin-3-yl, 2H-oxazin-4-yl, 2H-oxazin-5-yl, 2H-oxazin-6-yl, 4H-oxazin-3-yl, 4H-oxazin-4-yl, 4H-oxazin-5-yl, 4H-oxazin-6-yl, 6H-oxazin-3-yl, 6H-oxazin-4-yl, 7H-oxazin-5-yl, 8H-oxazin-6-yl, 2H-1,3-oxazin-2-yl, 2H-1,3-oxazin-4-yl, 2H-1,3-oxazin-5-yl, 2H-1,3-oxazin-6-yl, 4H-1,3-oxazin-2-yl, 4H-1,3-oxazin-4-yl, 4H-1,3-oxazin-5-yl, 4H-1,3-oxazin-6-yl, 6H-1,3-oxazin-2-yl, 6H-1,3-oxazin-4-yl, 6H-1,3-oxazin-5-yl, 6H-1,3-oxazin-6-yl, 2H-1,4-oxazin-2-yl, 2H-1,4-oxazin-3-yl, 2H-1,4-oxazin-5-yl, 2H-1,4-oxazin-6-yl, 4H-1,4-oxazin-2-yl, 4H-1,4-oxazin-3-yl, 4H-1,4-oxazin-4-yl, 4H-1,4-oxazin-5-yl, 4H-1,4-oxazin-6-yl, 6H-1,4-oxazin-2-yl, 6H-1,4-oxazin-3-yl, 6H-1,4-oxazin-5-yl, 6H-1,4-oxazin-6-yl, 1,4-dioxine-2-yl, 1,4-oxathiin-2-yl, 1H-azepine, 1H-[1,3]-diazepine, 1H-[1,4]-diazepine, and the like.

Examples for 5- or 6-membered monocyclic heteroaromatic rings containing 1, 2, 3 or 4 heteroatoms selected from N, O and S as ring members are 2-furyl, 3-furyl, 2-thienyl, 3-thienyl, 1-pyrrolyl, 2-pyrrolyl, 3-pyrrolyl, 1-pyrazolyl, 3-pyrazolyl, 4-pyrazolyl, 5-pyrazolyl, 1-imidazolyl, 2-imidazolyl, 4-imidazolyl, 5-imidazolyl, 2-oxazolyl, 4-oxazolyl, 5-oxazolyl, 3-isoxazolyl, 4-isoxazolyl, 5-isoxazolyl, 2-thiazolyl, 4-thiazolyl, 5-thiazolyl, 3-isothiazolyl, 4-isothiazolyl, 5-isothiazolyl, 1,3,4-triazol-1-yl, 1,3,4-triazol-2-yl, 1,3,4-triazol-3-yl, 1,2,3-triazol-1-yl, 1,2,3-triazol-2-yl, 1,2,3-triazol-4-yl, 1,2,5-oxadiazol-3-yl, 1,2,3-oxadiazol-4-yl, 1,2,3-oxadiazol-5-yl, 1,3,4-oxadiazol-2-yl, 1,2,5-thiadiazol-3-yl, 1,2,3-thiadiazol-4-yl, 1,2,3-thiadiazol-5-yl, 1,3,4-thiadiazol-2-yl, 2-pyridinyl, 3-pyridinyl, 4-pyridinyl, 1-oxopyridin-2-yl, 1-oxopyridin-3-yl, 1-oxopyridin-4-yl, 3-pyridazinyl, 4-pyridazinyl, 2-pyrimidinyl, 4-pyrimidinyl, 5-pyrimidinyl, 2-pyrazinyl, 1,3,5-triazin-2-yl, 1,2,4-triazin-3-yl, 1,2,4-triazin-5-yl, 1,2,3,4-tetrazin-1-yl, 1,2,3,4-tetrazin-2-yl, 1,2,3,4-tetrazin-5-yl and the like.

An "aromatic ring or ring system" in terms of the present invention is carboaromatic; i.e. it contains no heteroatoms as ring members. It is monocyclic or a condensed system in which at least one of the rings is aromatic, i.e. conforms to the Hückel 4n+2 π electrons rule. Examples are phenyl, naphthyl, anthracenyl, phenanthrenyl, indanyl, indenyl and fluorenyl.

A "heteroaromatic ring or ring system" in terms of the present invention contains at least one heteroatom or heteroatom group selected from N, O, S, NO, SO and SO$_2$ as ring member. It is monocyclic or a condensed system in which at least one of the rings is aromatic. Examples for monocyclic heteroaromatic rings are the above listed 5- or 6-membered monocyclic heteroaromatic rings. Examples for condensed systems are the following:

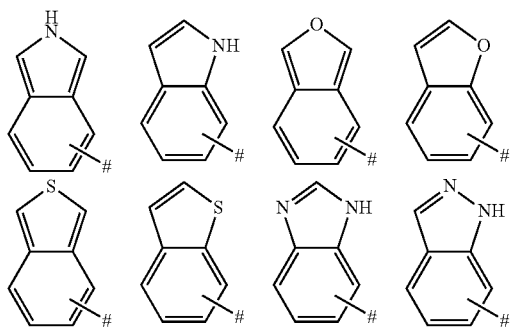

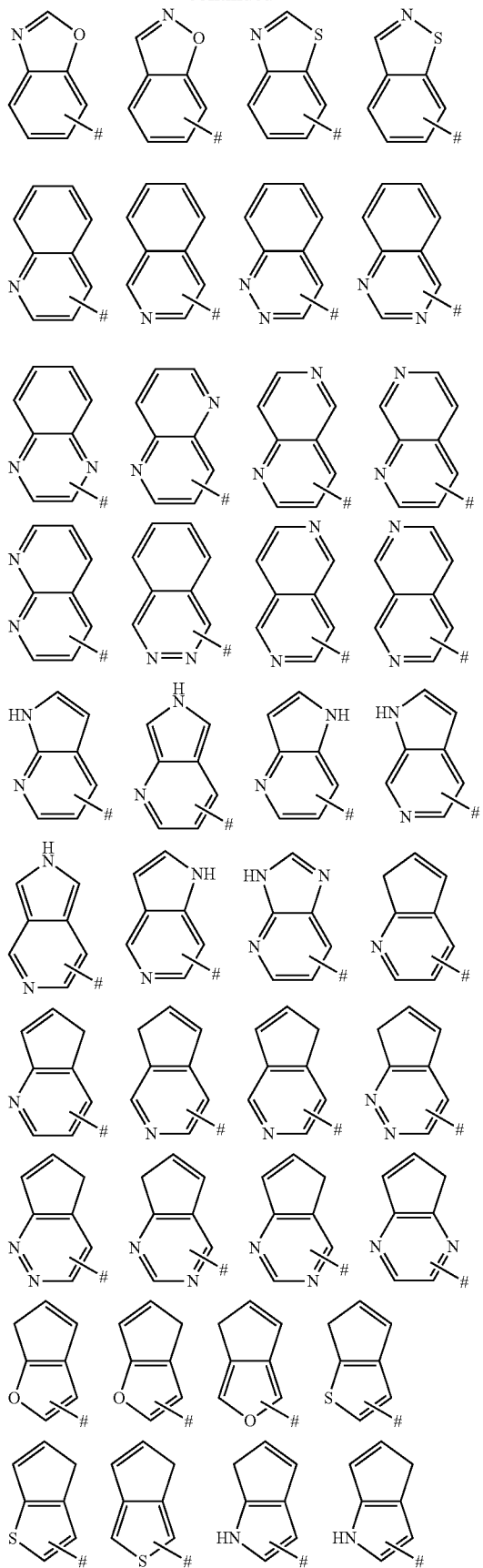

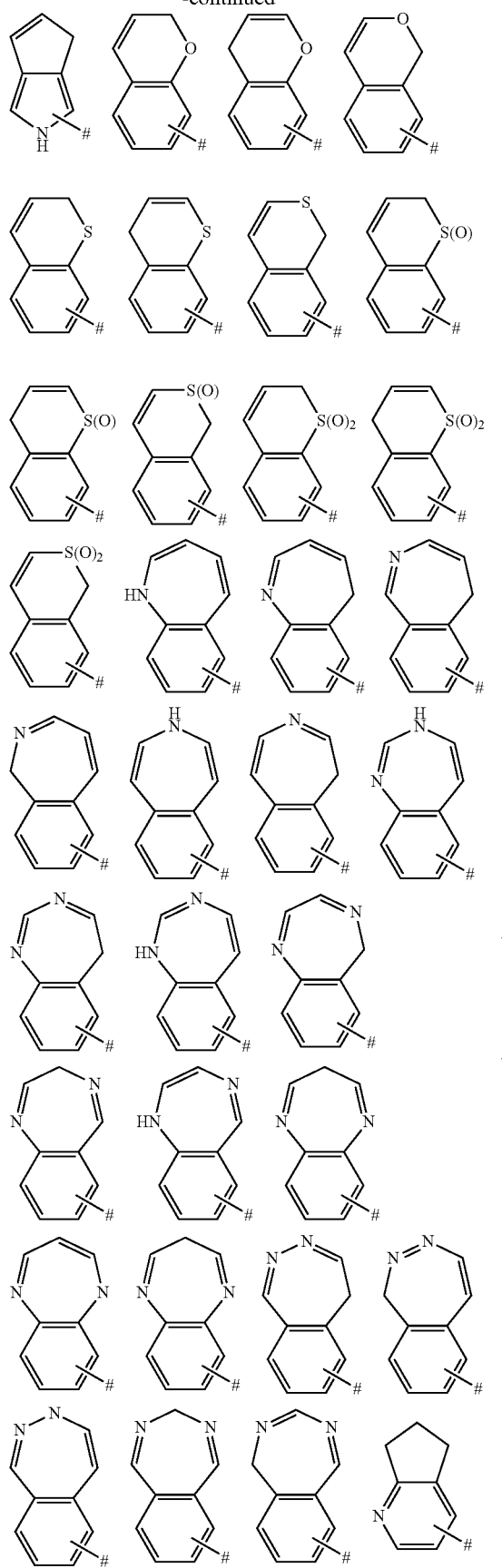
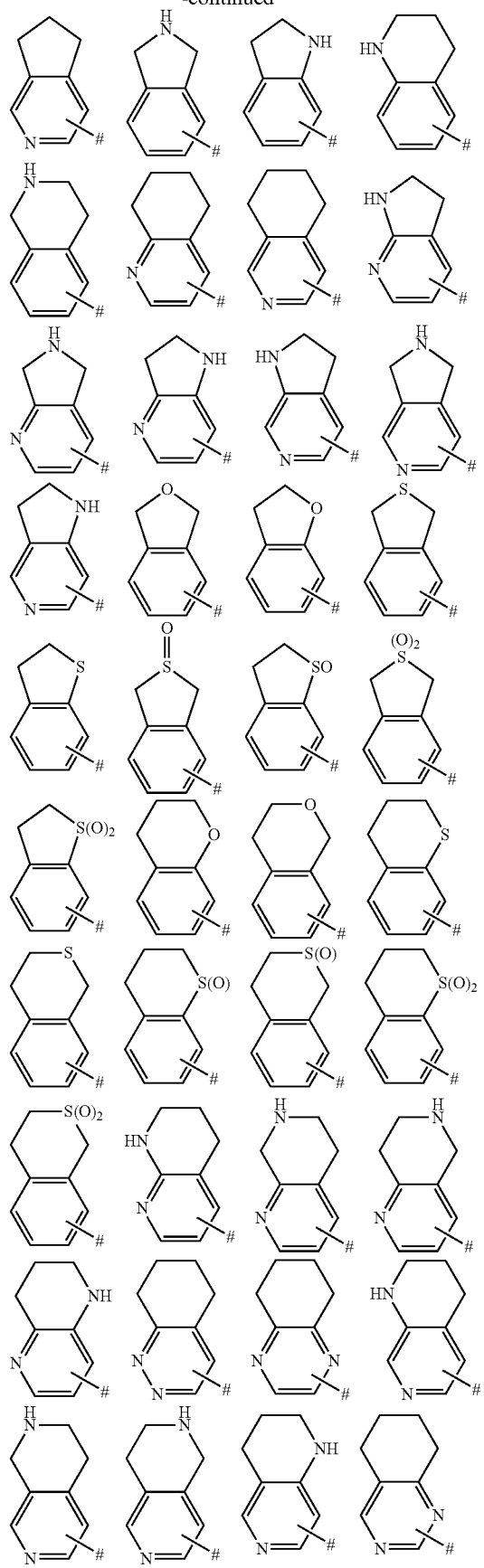

-continued

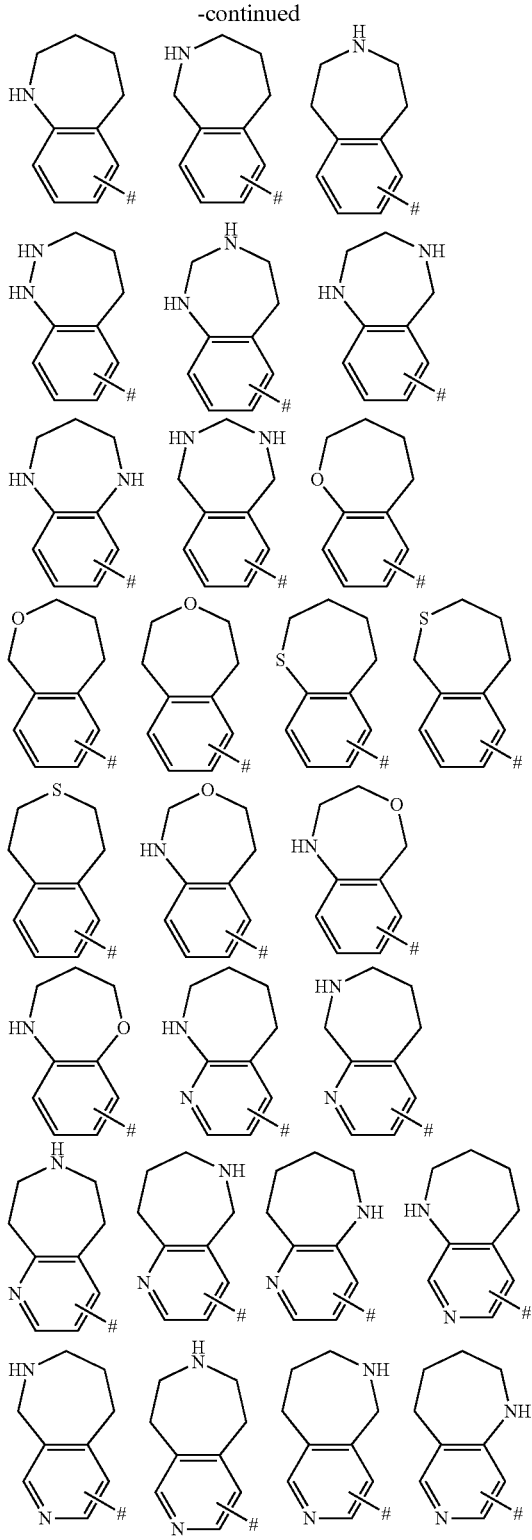

In the above structures # denotes the attachment point to the remainder of the molecule. The attachment point is not restricted to the ring on which this is shown, but can be on either of the two rings, and may be on a carbon or on a nitrogen ring atom. If the rings carry one or more substituents, these may be bound to carbon and/or to nitrogen ring atoms.

The below remarks made to the preferred and particular embodiments of the acrylate compound, the STP and the photoinitiator as well as to their uses apply both as taken alone and, in particular, in any conceivable combination with each other.

Acrylate Compounds

In the present invention, the term "acrylate compounds" refers on the one side to polymers which contain acrylates (to be more precise acrylic acid esters) in polymerized form as main component of the polymer (acrylate polymers in the proper sense). "Main component" means in this context that the polymer is composed of at least 60 mol-%, preferably of at least 80 mol-%, in particular of at least 90 mol-%, specifically of at least 95 mol-%, of acrylate (=acrylic acid ester) repeating units, relative to 1 mol of polymer. On the other side, the term "acrylate compounds" also encompasses monomeric or polymeric compounds which contain acrylate or methacrylate groups with intact C—C double bonds; i.e. the acrylate or methacrylate groups are not present in polymerized form, but bound, for example, via their carboxylic group to the remainder of the molecule. Polymeric compounds contain the acrylate or methacrylate groups with intact C—C double bonds at their termini and/or in their side chains, while the rest of the polymer is derived from monomers different from acrylates and methacrylates. If not specified otherwise, the term "acrylate polymers" as used herein relates to acrylate polymers in the proper sense as defined above and below.

Acrylate polymers in the proper sense contain repeating units of the following formula I as main component of the polymer:

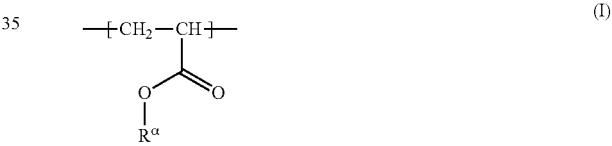

$R^\alpha$ is a group derived from an organic hydroxy compound, e.g. from an alcohol, e.g. an alkanol, a cycloalkanol, an alkanediol, a cycloalkanediol, a polyetherpolyol, a polyethermonool, an alkanol containing, apart from the OH group, other functional groups, a hydroxyaromatic compound, etc. $R^\alpha$ in the various repeating units can be derived from different hydroxy compounds. "Main component" means in this context that the polymer is composed of at least 60 mol-%, preferably of at least 80 mol-%, in particular of at least 90 mol-%, specifically of at least 95 mol-%, of the above acrylate repeating units of formula I, relative to 1 mol of polymer. Other optionally present repeating units are for example derived from methacrylates, the repeating unit having the following formula II; acrylic acid, the repeating unit having the following formula III; or methacrylic acid, the repeating unit having the following formula IV:

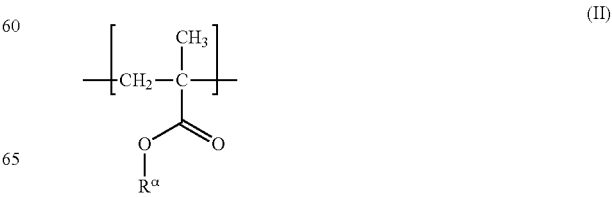

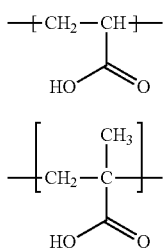

(III)

(IV)

R$^\alpha$ in compound II is a group derived from a hydroxy compound, e.g. from an alkanol, an alkandiol, or a hydroxyaromatic compound. R$^\alpha$ in compounds I and II may be the same or different.

Optionally present repeating units can moreover be derived from vinyl esters, such as vinyl acetate or vinyl propionate, vinyl ethers, such as methylvinyl ether, ethylvinyl ether, propylvinyl ether, isopropylvinyl ether, isobutylvinyl ether, tert-butylvinyl ether and the like, vinylaromatic compounds, such as styrene, or olefins, especially α-olefins, such as ethylene, propene, but-1-ene, isobutene and the like.

Preferably however, optionally present repeating units are derived only from methacrylates (formula II) acrylic acid (formula Ill) and methacrylic acid (formula IV).

Monomeric or polymeric acrylate compounds which contain acrylate or methacrylate groups with intact C—C double bonds, while the rest of the molecule is composed of other units, can be illustrated as compounds of formula V

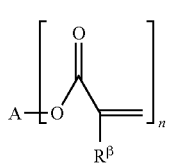

(V)

where
A is a monomeric or polymeric backbone group,
RR is H or methyl; and
n is from 2 to 100, preferably from 2 to 50.

In a particular embodiment, n is 2 to 10, specifically 2 to 5.

In another particular embodiment, n is 5 to 100, specifically 5 to 50, more specifically 5 to 20.

"Backbone group" in this context means that A is either a diradical (if n=2) or higher radical (if n>2) with a defined molar mass (A is in this case a monomeric backbone group) which is substituted by n groups —O—C(O)—C(R$^\beta$)=CH$_2$, or is a polymeric diradical (if n=2) or higher radical (if n>2) with a molar mass distribution (thus a polymeric backbone group) which carries n groups —O—C(O)—C(R$^\beta$)=CH$_2$. In case of a polymeric backbone A, the groups —O—C(O)—C(R$^\beta$)=CH$_2$ may be on the termini and/or in the side chains of the polymer. In case of a monomeric backbone group A, n is generally 2, 3 or 4, mostly 2 or 3.

In terms of the present invention, the term "polymer" comprises oligomers, i.e. also dimers, trimers and other lower "-mers".

The polymer backbone A may be derived, for example, from polyureas, polyurethanes, polyesters, polyethers, epoxy compounds and the like.

If A is divalent (n=2), the backbone group is A preferably either a monomeric group, or is a polymeric backbone carrying at two termini acrylate or methacrylate groups with intact C—C double bonds. Examples therefor are compounds of following formula:

where A is a divalent monomeric or polymeric backbone. In case of monomeric backbones, A is preferably an aliphatic, cycloaliphatic, mixed aliphatic-cycloaliphatic, aromatic or araliphatic diradical which may be interrupted by one or more —O—, —NH—, —S—, —C(O)—, —C(O)—O— or —C(O)—NH— groups and/or may be substituted by one or more OH, NH$_2$, C(O)OH or C(O)OR groups, where R is C$_1$-C$_4$-alkyl. Examples for such groups A are for example derived from bisphenol A gylcidyl ether. Examples for polymeric backbone groups A are derived from oligomers or polymers of bisphenol A gylcidyl ether. Such compounds wherein A is a divalent monomeric or polymeric backbone and is derived from bisphenol A gylcidyl ether are illustrated by following formula:

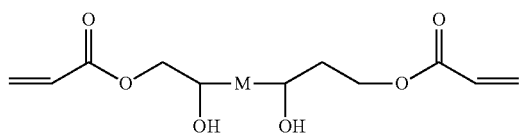

wherein M is:

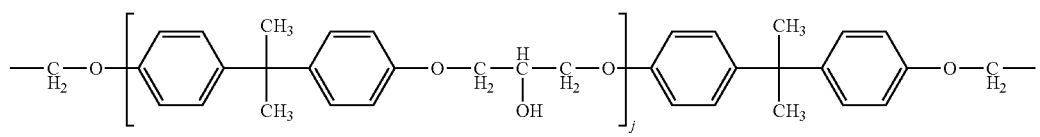

wherein j is 0 (A is a divalent monomeric backbone) or 1 to 20, preferably 1 to 4 (A is a divalent polymeric backbone).

Further examples for divalent polymeric backbones A are polyether groups, such as the below polyether structure in which k is 0.

If A is tri- or polyvalent (n=3 to 100 or preferably 3 to 50), the acrylate or methacrylate groups with intact C—C double bonds are generally contained as side chains of a polymer backbone A and optionally also as terminal groups at the termini of the polymer.

Apart from the above examples, further illustrative examples for compounds V in which A is a polymer backbone with n acrylate groups are the following structures:

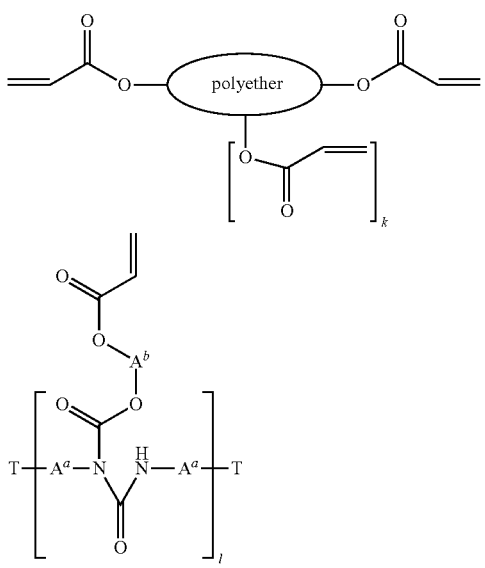

wherein k is 0 to 20, l is 2 to 25, $A^a$ is a divalent aliphatic, cycloaliphatic, mixed aliphatic-cycloaliphatic, aromatic or araliphatic radical, $A^b$ is a divalent aliphatic radical and T is a terminal group, such as H, —NCO, —NH—C(O)—NH$_2$ or —O—C(O)—NH$_2$.

The polyether group is preferably derived from ethyleneoxide, propyleneoxide or mixtures thereof.

$A^a$ is preferably $C_2$-$C_{10}$-alkylene or a diradical of following formulae:

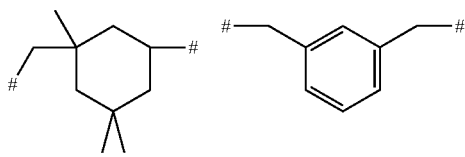

and is in particular $C_2$-$C_{10}$-alkylene; and $A^b$ is $C_2$-$C_4$-alkylene.

Such acrylate compounds which contain acrylate or methacrylate groups with intact C—C double bonds and methods for preparing them are known and are for example commercialized under the Laromer® brand of BASF.

Among the above-described acrylate compounds, preference is given to acrylate polymers in the proper sense, i.e. to polymers which contain acrylates (acrylic acid esters) in polymerized form as main component of the polymer.

In a preferred embodiment, the acrylate compound is selected from acrylate compounds containing functional groups which are prone to photoinitiation; acrylate compounds containing hydroxyl groups; and mixtures thereof. More preferably the acrylate compound is selected from acrylate polymers (in the proper sense; i.e. polymers which contain acrylates (acrylic acid esters) in polymerized form as main component of the polymer) containing functional groups which are prone to photoinitiation; acrylate polymers (in the proper sense) containing hydroxyl groups; and mixtures thereof.

In terms of the present invention, groups which are prone to photoinitiation are functional groups which, upon radiation with UV or visible light (=photoinitiation or photoactivation), lead to a crosslinking or curing reaction; generally by the formation of new covalent bonds. These groups thus act as an integrated photoinitiator. Examples for such groups prone to photoinitiation are keto groups, formyl groups, thioketo groups, C—C double bonds and C—C triple bonds. C—C double and triple groups, upon photoactivation, form radicals which generally react with other C—C double or triple bonds. C—H insertion is however also possible. Carbonyl or thiocarbonyl groups often give C—H insertion reactions, the (thio)carbonyl group being transformed into a OH or SH group.

Thus, the acrylate compounds which contain acrylate or methacrylate groups with intact C—C double bonds inherently contain groups which are prone to photoinitiation, namely said intact C—C double bonds.

Preferably, the groups prone to photoinitiation are selected from the group consisting of keto groups, formyl groups, thioketo groups and C—C triple bonds, and more preferably from keto groups, formyl groups and thioketo groups.

Acrylate compounds containing functional groups which are prone to photoinitiation are preferably selected from acrylate polymers in the proper sense (i.e. polymers containing repeating units of the formula I as main component of the polymer) which contain functional groups which are prone to photoinitiation and which are in particular selected from keto groups, formyl groups and thioketo groups.

In the acrylate polymers in the proper sense which contain functional groups selected from keto groups, formyl groups and thioketo groups, these keto, formyl or thioketo groups are generally a part of the radical $R^\alpha$; i.e. in a part of the repeating units of formula I or II, if present, $R^\alpha$ is derived from a hydroxy compound which contains a keto, formyl or thioketo group.

In particular, the acrylate compounds containing functional groups which are prone to photoinitiation are selected from acrylate polymers in the proper sense (i.e. polymers containing repeating units of the formula I as main component of the polymer) which contain keto groups.

The keto groups are preferably present as benzophenone groups or as acetophenone groups. Accordingly, in a part of the repeating units of formula I or II, if present, $R^\alpha$ is preferably derived from a hydroxy compound which contains a benzophenone or an acetophenone group.

Such radicals $R^\alpha$ containing a benzophenone group are preferably groups of following formula $R^\alpha$.1:

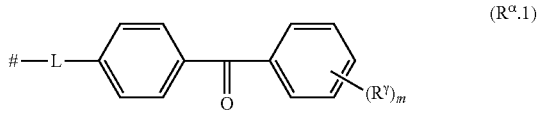

where

\# is the attachment point to the remainder of the molecule, i.e. to O of the (meth)acrylate group);

L is a bond or a spacer group, such as a $C_1$-$C_8$-alkylene group which is optionally bound to the phenyl ring via a linking group such as —O—, —O—C(O)—, —C(O)—O—, —O—C(O)—O—, —NH—, —NH—C(O)—, —C(O)—NH—, —NH—C(O)—NH—, —O—C(O)—NH—, —NH—C(O)—O— and the like;

Rγ is selected from OH, $C_1$-$C_6$-alkyl and $C_1$-$C_6$-alkoxy; and m is 0, 1, 2, 3, 4 or 5.

Radicals $R^\alpha$ containing an acetophenone group are preferably groups of following formula $R^\alpha.2$:

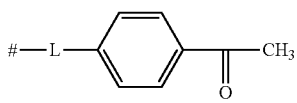

(R$^\alpha$.2)

where # is the attachment point to the remainder of the molecule, i.e. to O of the (meth)acrylate group; and L is a bond or a spacer group, such as a $C_1$-$C_8$-alkylene group which is optionally bound to the phenyl ring via a linking group such as —O—, —O—C(O)—, —C(O)—O—, —O—C(O)—O—, —NH—, —NH—C(O)—, —C(O)—NH—, —NH—C(O)—NH—, —O—C(O)—NH—, —NH—C(O)—O— and the like.

In the above benzophenone group L is preferably a spacer group, in particular a $C_2$-$C_6$-alkylene group which is bound to the phenyl ring via a —O—C(O)—O— group, and m is preferably 0.

In the above acetophenone group L is preferably a spacer group, in particular a $C_2$-$C_6$-alkylene group.

More preferably, the keto groups are preferably present as benzophenone groups. Accordingly, in a part of the repeating units of formula I or II, if the latter is present, $R^\alpha$ is preferably derived from a hydroxy compound which contains a benzophenone group. More preferably, $R^\alpha$ is a benzophenone group of the above formula $R^\alpha.1$. L is preferably a $C_1$-$C_8$-alkylene group which is optionally bound to the phenyl ring via a linking group selected from —O—, —O—C(O)—, —C(O)—O—, —O—C(O)—O—, —NH—, —NH—C(O)—, —C(O)—NH—, —NH—C(O)—NH—, —O—C(O)—NH— and —NH—C(O)—O—. In particular, $R^\alpha$ is a benzophenone group of formula $R^\alpha.1.1$:

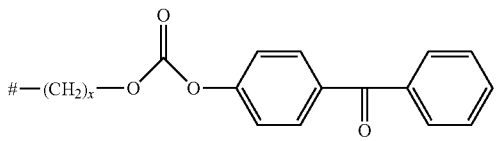

(R$^\alpha$.1.1)

where x is 2 to 6, in particular 4.

In particular, the acrylate compounds containing functional groups which are prone to photoinitiation are selected from acrylate polymers (in the proper sense) being composed of from 80 to 99.9 mol-%, preferably of from 85 to 99.9 mol-%, in particular of from 90 to 99.9 mol-%, of repeating units of the formula I wherein $R^\alpha$ is $C_1$-$C_{10}$-alkyl, preferably $C_4$-$C_8$-alkyl;

from 0.01 to 20 mol-%, preferably from 0.02 to 10 mol-%, in particular from 0.1 to 1 mol-%, specifically from 0.1 to 0.5 mol-%, very specifically from 0.1 to 0.3 mol-%, of repeating units of the formula I wherein $R^\alpha$ is a benzophenone group of formula $R^\alpha.1$ as defined above; and from 0 to 15 mol-%, preferably from 0 to 10 mol-% of repeating units of formula III (acrylic acid);

relative to 1 mol of polymer, where the mol percentages of repeating units of the formula I wherein $R^\alpha$ is $C_1$-$C_{10}$-alkyl, repeating units of the formula I wherein $R^\alpha$ is a benzophenone group, and of repeating units of formula III essentially sum up to 100 mol-%.

Specifically, the acrylate compounds containing functional groups which are prone to photoinitiation are selected from acrylate polymers (in the proper sense) being composed of from 80 to 99.9 mol-%, preferably of from 85 to 99.9 mol-%, in particular of from 90 to 99.9 mol-%, of repeating units of the formula I wherein $R^\alpha$ is n-butyl and/or 2-ethylhexyl (i.e. the repeating units are derived from n-butylacrylate and/or 2-ethylhexylacrylate);

from 0.01 to 20 mol-%, preferably from 0.02 to 10 mol-%, in particular from 0.1 to 1 mol-%, specifically from 0.1 to 0.5 mol-%, very specifically from 0.1 to 0.3 mol-%, of repeating units of the formula I wherein $R^\alpha$ is a benzophenone group of formula $R^\alpha.1.1$ as defined above; and from 0 to 15 mol-%, preferably from 0 to 10 mol-% of repeating units of formula III (i.e. the repeating unit is derived from acrylic acid);

relative to 1 mol of polymer, where the mol percentages of repeating units of the formula I wherein $R^\alpha$ is n-butyl and/or 2-ethylhexyl, repeating units of the formula I wherein $R^\alpha$ is a benzophenone group, and of repeating units of formula III essentially sum up to 100 mol-%.

"Essentially sum up to 100 mol-%" means to express that the acrylate polymers may also contain minor amounts of components deriving from the production process, e.g. deriving from starter compounds, chain regulators and the like. The amounts of such optionally present compounds do not exceed 5 mol-% of the polymer and in particular do not exceed 2 mol-% of the polymer.

Acrylate polymers in the proper sense with keto groups and methods for producing them are known and commercialized, for example, under the acResin® brand of BASF. Polymers with formyl or thioketo groups can be produced analogously. Acrylate polymers in the proper sense with other groups prone to photoactivation can be produced analogously, e.g. via radical polymerization of the olefinically unsaturated monomers and, if desired or necessary, transesterification of the (meth)acrylate polymers or esterification of optionally present polymerized (meth)acrylic acid with hydroxy compounds of the desired composition.

In an alternatively more preferred embodiment the acrylate compounds are acrylate polymers in the proper sense containing hydroxyl groups.

Preferably, the acrylate polymers containing hydroxyl groups contain $C_2$-$C_{10}$-hydroxyalkylacrylate, more preferably $C_2$-$C_4$-hydroxyalkylacrylate, in (co)polymerized form.

"(Co)polymerized" means to include both homopolymers in which the acrylate polymers are composed of only hydroxyalkylacrylates (in polymerized form, of course), and copolymers containing apart from the hydroxyalkylacrylates in polymerized form other monomers in polymerized form, such as $C_1$-$C_{10}$-alkylacrylates.

Preferably, the acrylate polymers containing hydroxyl groups are copolymers of $C_2$-$C_{10}$-hydroxyalkylacrylate, more preferably of $C_2$-$C_4$-hydroxyalkylacrylate, and other ethylenically unsaturated monomers, where these other monomers are preferably selected from $C_1$-$C_{10}$-alkylacrylates.

More preferably, acrylate polymers containing hydroxyl groups are composed of at least 60 mol-%, preferably of at least 80 mol-%, in particular of at least 90 mol-%, specifically of at least 95 mol-%, of the above acrylate repeating units of formula I, relative to 1 mol of polymer, where a part of the groups $R^\alpha$ is a $C_2$-$C_{10}$-hydroxyalkyl group, preferably a $C_2$-$C_4$-hydroxyalkyl group.

Preferably, 1 to 90 mol-%, more preferably 2 to 50 mol-%, in particular 3 to 10 mol-% of the groups $R^\alpha$ is a $C_2$-$C_{10}$-hydroxyalkyl group, preferably a $C_2$-$C_4$-hydroxyalkyl group. The other groups $R^\alpha$ are preferably $C_1$-$C_{10}$-alkyl groups, more preferably $C_1$-$C_4$-alkyl groups.

Apart from the above acrylate repeating units of formula I, the acrylate polymers containing hydroxyl groups may contain further repeating units, such as repeating units derived from vinyl esters, such as vinyl acetate or vinyl propionate, vinyl ethers, such as methylvinyl ether, ethylvinyl ether, propylvinyl ether, isopropylvinyl ether, isobutylvinyl ether, tert-butylvinyl ether and the like, vinylaromatic compounds, such as styrene, or olefins, especially α-olefins, such as ethylene, propene, but-1-ene, isobutene and the like.

Preferably however, the acrylate polymers containing hydroxyl groups are exclusively composed of the above acrylate repeating units of formula I, where a part of the groups $R^\alpha$ is a $C_2$-$C_{10}$-hydroxyalkyl group, preferably a $C_2$-$C_4$-hydroxyalkyl group. Minor amounts of components deriving from the production process, e.g. deriving from starter compounds, chain regulators and the like, may however be present.

Acrylate polymers containing hydroxyl groups and methods for producing them are known and commercialized, for example, under the Joncryl® brand of BASF.

In particular, the acrylate compounds are the above-described acrylate polymers in the proper sense (i.e. polymers containing repeating units of the formula I as main component of the polymer) which contain functional groups which are prone to photoinitiation.

In a preferred embodiment, the acrylate compounds have a weight average molecular weight of more than 30000, e.g. from >30000 to 1000000 or >30000 to 500000 or >30000 to 300000, more preferably of at least 50000, e.g. from 50000 to 1000000 or 50000 to 500000 or 50000 to 300000, and in particular of at least 100000, e.g. from 100000 to 1000000 or 100000 to 500000 or in particular 100000 to 300000. These molecular weights apply specifically to acrylate polymers in the proper sense containing functional groups which are prone to photoinitiation and specifically containing keto groups.

In an alternatively preferred embodiment the acrylate compounds have a weight average molecular weight of 500 to 30000, more preferably from 1000 to 25000. These molecular weights apply specifically to acrylate polymers in the proper sense containing hydroxy groups.

In another embodiment the acrylate compounds have a weight average molecular weight of from 200 to 10000, in particular from 200 to 5000. These molecular weights apply specifically to acrylate compounds which contain acrylate or methacrylate groups with intact C—C double bonds.

In a particular embodiment, the acrylate compounds have a weight average molecular weight of more than 30000, e.g. from >30000 to 1000000 or >30000 to 500000 or >30000 to 300000, more preferably of at least 50000, e.g. from 50000 to 1000000 or 50000 to 500000 or 50000 to 300000, and in particular of at least 100000, e.g. from 100000 to 1000000 or 100000 to 500000 or in particular 100000 to 300000.

If not mentioned otherwise, in terms of the present invention, the values for number-average and weight-average molecular weight are as determined with gel permeation chromatography (GPC), also termed size-exclusion chromatography (SEC), using a polystyrene standard:

Standard: polystyrene (PS) with narrow molar mass standards (PS molar mass range 580-7500000 g/mol, PSS). Hexylbenzene (162 g/mol) was used as a low molar mass marker. Extrapolation was used to estimate the molecular weight distribution outside the range of these calibration standards with respect to the exclusion and permeation limits.

Eluent: THF+0.1% trifluoroacetic acid
Flow rate: 1 mL/min
Injection volume: 100 µl
Concentration: 2 mg/ml The sample solutions were filtered prior to analysis over Sartorius Minisart SRP 25 (0.2 µm).
Column temperature: 35° C.
Column combination of PLgel pre-column/PLgel MIXED-B
Detector: DRI Agilent 1100

Preferably, the acrylate polymers have a glass transition temperature ($T_g$) of from −75 to −25° C., more preferably from −70 to −30° C., in particular from −65 to −40° C.

The glass transition temperature given above refers to values as obtained with $T_g$ method 92/69/EEC A.1 DSC 10° C./min.

Silyl-Terminated Polymers

Silyl-terminated polymers (STPs) are polymers, generally with an organic backbone, which contain silyl groups at the termini (chain ends) of the polymers. Generally, at least one of the substituents on the silicium atom is a hydrolysable group, especially an alkoxy group. In the presence of atmospheric moisture such alkoxysilyl-terminated polymers are capable of undergoing hydrolyzation/condensation reactions with each other, which results in a curing or crosslinking of the polymers. The polymer backbone of the STPs is generally a polyether, polyester, polyamide, polyimine, polyurethane, poly(meth)acrylate, polyvinylester, polyolefin or mixed forms thereof.

STPs and methods for producing them are generally known and are inter alia described in US 2012/0238695, DE-A-102011003425, DE-A-102004018548 and the references cited therein.

Preference is given to STPs with a weight-average molecular weight $M_w$ of from 350 to 30000, more preferably from 500 to 25000, even more preferably from 1000 to 22000, in particular from 5000 to 20000, specifically from 7000 to 19000.

The number-average and weight-average molecular weights of STPs are as determined by the above described GPC/SEC method using polystyrene standards.

In a preferred embodiment, the silyl-terminated polymer is a polymer of formula VI:

$$[(R')_a(R''O)_{3-a}Si\text{-}L^1\text{-}Y]_b\text{---Po} \qquad (VI)$$

where

Po is the di-, tri- or tetravalent radical of a base polymer;
each Y is independently selected from a bond, —NH—C(=O)—O—, —O—C(=O)—NH—, —C(=O)—NH-$L^2$-NH—C(=O)—NH—, —NH—C(=O)—NH-$L^2$-NH—C(=O)—, —O—C(=O)—, —C(=O)—O—, —NH—C(=O)—S—, —S—C(=O)—NH— and —O—;
R' and R", independently of each other and independently of each occurrence, are selected from $C_1$-$C_6$-alkyl;
$L^1$ is $C_1$-$C_4$-alkylene
$L^2$ is a divalent aliphatic, cycloaliphatic or aromatic radical;
each a is independently 0 or 1; and
b is 2, 3 or 4.

If Po ends in an oxygen atom, this is not directly bound to an oxygen atom of Y. In this case, the oxygen atom of Y is to be understood to be omitted. If for instance the terminal group of Po is an oxygen atom and Y is —O—C(=O)—NH—, the group Y bound to this oxygen atom of Po is to be understood in this case to be —C(=O)—NH—, so that Po—Y is in the case in sum Po—O—C(=O)—NH—, In a preferred embodiment, Po is the di-, tri- or tetravalent radical of a polymer selected from polyethers, polyesters, polyamides, polyimines, polyurethanes, poly(meth)acrylates, polyvinylesters, polyolefins and mixed forms thereof.

Polyether polymers from which Po is derived are preferably composed of repeating units

—[—A$^1$—O—]— where each A$^1$ is independently —CH$_2$—CH$_2$—, —CH$_2$—CH(CH$_3$)—, —CH(CH$_3$)—CH$_2$—, or —(CH$_2$)$_4$—; i.e. they are derived from polyethyleneglycol, polypropyleneglycol, poly-tetrahydrofuran and mixed forms (copolymers) thereof.

Polyesters from which Po is derived are preferably composed of repeating units

—[—B$^1$—C(=O)—O—]— or —[—C(=O)—B$^1$—C(=O)—O—B$^2$—O—]— where B$^1$ and B$^2$, independently of each other, are a divalent aliphatic, alicyclic, aliphatic-alicyclic, aromatic or araliphatic radical.

Polyamides from which Po is derived are preferably composed of repeating units

—[—B$^1$—C(=O)—N(R)—]— or —[—C(=O)—B$^1$—C(O)—N(R)—B$^2$—N(R)—]— where B$^1$ and B$^2$, independently of each other, are a divalent aliphatic, alicyclic, aliphatic-alicyclic, aromatic or araliphatic radical and R is H or C$_1$-C$_4$-alkyl or is a branching point and stands for example for —[—B$^1$—C(=O)—N(R)—]— or —[—C(=O)—B$^1$—C(O)—N(R)—B$^2$—N(R)—]— or —[—B$^2$—N(R)—C(=O)—B$^1$—C(O)—]—.

Polyimine polymers from which Po is derived are preferably composed of repeating units —[—A$^1$-N(R)—]—, where each A$^1$ is independently a divalent aliphatic, alicyclic, aliphatic-alicyclic, aromatic or araliphatic radical and R is H or C$_1$-C$_4$-alkyl or is a branching point and stands for example for —[—A$^1$-N(R)—]—.

Polyurethanes from which Po is derived are preferably composed of repeating units

—[—B$^1$—O—C(=O)—N(R)—B$^2$—N(R)—C(=O)—O—]— where B$^1$ and B$^2$, independently of each other, are a divalent aliphatic, alicyclic, aliphatic-alicyclic, aromatic or araliphatic radical and R is H or C$_1$-C$_4$-alkyl or is a branching point.

Poly(meth)acrylates from which Po is derived are preferably composed of repeating units

—[—CH$_2$—C(R)(C(O)OR')—]— where R is H (polyacrylates) or methyl (methacrylates) and R' is C$_1$-C$_{12}$-alkyl which may carry various substituents, such as OH, C$_1$-C$_4$-alkoxy, amino, C$_1$-C$_4$-alkylamino, di-(C$_1$-C$_4$)-alkylamino, CN, trimethylsilyl etc.

Polyvinylesters from which Po is derived are preferably composed of repeating units

—[—CH$_2$—CH(OR)—]— where R is C$_1$-C$_{12}$-alkyl.

Polyolefins from which Po is derived are preferably polymers of α-olefins and are preferably composed of repeating units

—[—CH$_2$—CH(R)—]— where R is H C$_1$-C$_{12}$-alkyl.

In particular, Po is the divalent radical (i.e. b is 2) of a polyether. The polyether is in particular a polyethylene glycol or polypropylene glycol, and is specifically polypropylene glycol.

In a particular embodiment, in polymer VI
Y is —NH—C(=O)—O— (where NH is bound to L$^1$);
R' and R", independently of each other and independently of each occurrence, are selected from methyl and ethyl and are in particular methyl; and
each L$^1$ is independently —CH$_2$— or C$_3$-alkylene, in particular —CH$_2$— or —CH$_2$CH$_2$CH$_2$—.

In a specific embodiment, polymer VI is a polymer of formula VI.1

(CH$_3$O)$_2$(CH$_3$)Si—CH$_2$—NH—C(=O)—O—[CH(CH$_3$)—CH$_2$—O—]$_u$—C(=O)—NH—CH$_2$—Si(CH$_3$)(OCH$_3$)$_2$  (VI.1)

where u is from 1 to 500, preferably 10 to 400, more preferably 50 to 300, in particular from 100 to 250, specifically from 100 to 200, very specifically from 120 to 180.

In another specific embodiment, polymer VI is a polymer of formula VI.2

(CH$_3$O)$_3$Si—(CH$_2$)$_3$—NH—C(=O)—O—[CH(CH$_3$)—CH$_2$—O—]$_u$—C(=O)—NH—(CH$_2$)$_3$—Si(OCH$_3$)$_3$  (VI.2)

where u is from 1 to 500, preferably 10 to 400, more preferably 50 to 400, in particular from 100 to 350, specifically from 200 to 350, very specifically from 200 to 310.

Such STPs are known and sold, for example under the Geniosil® brands from Wacker (e.g. Geniosil® STP-E 10) or Geniosil® STP-E 35)

Photoinitiators

In a preferred embodiment the at least one photoinitiator is a photolatent initiator which becomes active with UV C radiation, UV B radiation, UV A radiation and/or radiation in the visible range; a photoinitiator which is not photolatent and which becomes active with UV C radiation (100 to <280 nm); or a mixture of said photolatent latent initiator and said photoinitiator which is not photolatent and which becomes active with UV C radiation.

More preferably the at least one photoinitiator is a photolatent initiator which becomes active with UV C radiation, UV B radiation, UV A radiation and/or radiation in the visible range, or is a mixture of said photolatent latent initiator and said photoinitiator which is not photolatent and which becomes active with UV C radiation.

UV A radiation is electromagnetic radiation in the wavelength range of from 315 to <380 nm. UV B radiation is electromagnetic radiation in the wavelength range of from 280 to <315 nm. UV C radiation is electromagnetic radiation in the wavelength range of from 100 to <280 nm. Visible light is electromagnetic radiation in the wavelength range of from 380 to 780 nm.

In the present invention, photolatent initiators are mainly used for triggering the curing of the STP, while the "classical" photoinitiator which is not photolatent and which becomes active with UV C radiation serves mainly for triggering the crosslinking of the acrylate compound.

The use of a mixed system containing both a photolatent initiator and said photoinitiator which is not photolatent and which becomes active with UV C radiation has the advantage that the two different crosslinking reactions which can take place in the composition of the invention—on the one side curing of the acrylate compound and on the other side crosslinking of the STP—can be triggered selectively. If the photolatent initiator is chosen so that it becomes active with UV B radiation, UV A radiation and/or radiation in the visible range, crosslinking of the STP can be selectively triggered if the radiation source does essentially not emit in the UV C range, but in the UV B, UV A and/or visible region. Inversely, curing of the acrylate compound is selectively triggered if the radiation source does essentially not emit in the UV A, UV B and/or visible region. However, the combination of a photolatent initiator becomes active with UV C radiation with said photoinitiator which is not photolatent and which becomes active with UV C radiation is also advantageous, although the two initiators are activated at the same wavelength range, as the photolatent initiator which becomes active with UV C radiation can be activated in deeper layers than the "classical" photoinitiators.

Photolatent Initiators

Photolatent initiators in the terms of the present invention are compounds which under the influence of light, especially UV radiation and/or visible light, are converted into compounds which can act as initiators of a chemical reaction. To be more precise, the photolatent latent initiators, upon activation, can activate or promote or catalyze the curing or crosslinking of polymers, especially of the polymer(s) contained in the polymer composition of the present invention; specifically the STPs. In inactivated form, the photolatent latent initiators have no or virtually no effect on the curing or crosslinking of polymers.

The use of photolatent initiators for curing or crosslinking polymers has the advantage that the polymer compositions containing such initiators generally have a good open time (pot life) and simultaneously can be cured on demand.

The condensation of hydrolyzable substituents, such as alkoxy groups, in STPs is catalyzed by bases, but also by acids or certain metals or metal complexes.

Accordingly, in a preferred embodiment, the photolatent initiators are selected from photolatent bases, photolatent acid generators and photolatent metal-based initiators.

Photolatent bases (PLBs) are compounds which, when photoactivated, undergo a significant $pK_a$ jump. In inactivated form the photolatent bases are rather weak bases or even neutral compounds. Photoactivation converts them into compounds with a significantly higher basicity.

Generally, the PLBs are precursors of strong nitrogen bases, such as amidines, guanidines, amines (generally secondary amines) or imidazoles. In these precursor compounds, one of the basic nitrogen atoms is substituted by a photolytically cleavable group. This photolytically cleavable group reduces the (Lewis) basicity to such an extent that the precursor compound (i.e. the form in which the nitrogen base carries the photolytically cleavable group) does not act as an initiator. Moreover, in the amidine and also in the guanidine precursor compounds, the C=N double bond is present in reduced form, i.e. as a single bond, so that the PLB is a neutral compound and not an ammonium salt.

The photolytically cleavable group contains a moiety which is capable of absorbing radiation in the UV or visible light range, e.g. in the range of from 200 to 650 nm, and bring about photoelimination of the photolytically cleavable group and thus formation of the active base. The photolytically cleavable group contains generally an aromatic or heteroaromatic ring or ring system which is bound to the nitrogen atom of the base via a (substituted) methylene bridge, a (substituted) methylene-CO-bridge or a (substituted) ethylene bridge. Alternatively the photolytically cleavable group is a (substituted) allyl group. The aromatic or heteroaromatic ring or ring system may be unsubstituted or may carry one or more substituents. Suitable substituents are for example $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl, $C_1$-$C_6$-alkoxycarbonyl, phenyl and a 3-, 4-, 5-, 6- or 7-membered saturated, partially unsaturated or maximally unsaturated heterocyclic ring comprising 1, 2 or 3 heteroatoms or heteroatom groups selected from N, O, S, NO, SO and $SO_2$, as ring members, where phenyl or the heterocyclic ring is in turn optionally substituted with one or more substituents selected from $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl and $C_1$-$C_6$-alkoxycarbonyl. Of course, in these groups, the heteroaromatic ring or ring system as well as the 3- to 7-membered saturated, partially unsaturated or maximally unsaturated heterocyclic ring are selected in such a way that their basicity is not such that they can act as an initiator.

In a preferred embodiment, the PLBs are selected from compounds $B^a$—$Z^a$, where $B^a$ and $Z^a$ are covalently bound, and where $B^a$ is derived from a strong base selected from amidines, guanidines and secondary amines, and $Z^a$ is a photolytically removable group.

In particular, the PLBs are selected from compounds of formulae PLB.1 to PLB.7:

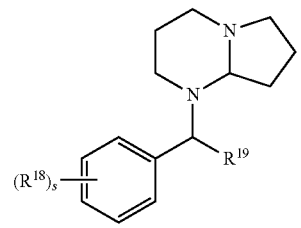

PLB.1

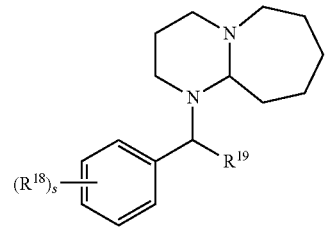

PLB.2

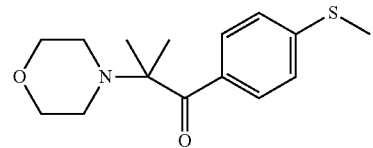

PLB.3

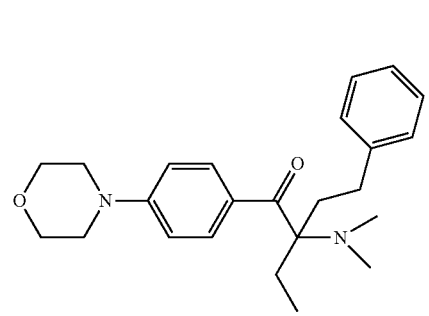

PLB.4

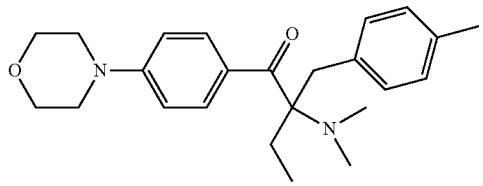

PLB.5

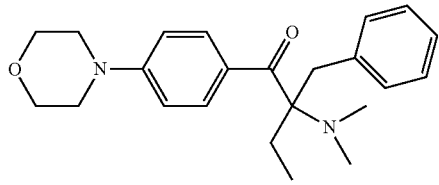

PLB.6

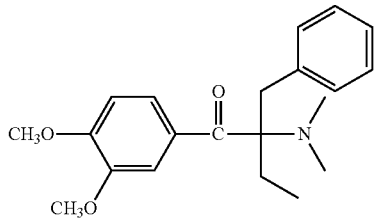

PLB.7 where
each $R^{18}$ is independently selected from $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl and $C_1$-$C_6$-alkoxycarbonyl;
$R^{19}$ is selected from hydrogen and $C_1$-$C_4$-alkyl; and
s is 0, 1, 2, 3, 4 or 5.

Among these, preference is given to PLB.1, PLB.2, PLB.4, PLB.5, PLB.6 and PLB.7, more preference to PLB.1, PLB.2, PLB.6 and PLB.7, and in particular to PLB.1.

In a particular embodiment of PLB.1 and PLB.2, $R^{18}$ is $C_1$-$C_6$-alkoxycarbonyl, specifically methoxycarbonyl, s is 0 or 1 and $R^{19}$ is hydrogen. In a specific embodiment, s is 1. Preferably, s is 1 and $R^{18}$ is bound in para-position to $CHR^{19}$. In another specific embodiment, s is 0.

The above PLBs become active with UV B and/or UV A radiation.

It may be advantageous to use additionally a photosensitizer which eases the photoactivation of the photolytically cleavable group. Suitable photosensitizers are e.g. aromatic ketones, e.g. substituted and unsubstituted benzophenones, thioxanthones, anthraquinones or dyes, like oxazines, acridines, phenazines and rhodamines.

Particularly suitable are substituted benzophenones and thioxanthones. Examples therefor are, in addition to benzophenone and thioxanthone as such, 4,4'-bis(dimethylamino)benzophenone, 4,4'-bis-(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenylbenzophenone, 2-methoxycarbonylbenzophenone, 4-benzoyl-4'-methyldiphenylsulfide, 4-methoxy-3,3'-methylbenzophenone, isopropylthioxanthone, chlorothioxanthone, 1-chloro-4-propoxythioxanthone, 2,4-dimethylthioxanthone, 2,4-diethylthioxanthone and 1,3-dimethyl-2-(2-ethylhexyloxy)thioxanthone as well as mixtures of the above compounds.

Further photosensitizers are for example 3-acylcoumarines, e.g. 3-benzoylcoumarine, 3-benzoyl-7-methoxycoumarine, 3-benzoyl-5,7-di(propoxy)coumarine, 3-benzoyl-6, 8-dichlorcoumarine, 3-benzoyl-6-chlorcoumarine, 3, 3'-carbonylbis[5,7-di(propoxy)coumarine], 3,3'-carbonylbis(7-methoxycoumarine), 3,3'-carbonylbis(7-diethylaminocoumarine), 3-isobutyroylcoumarine, 3-benzoyl-5,7-dimethoxycoumarine, 3-benzoyl-5,7-diethoxycoumarine, 3-benzoyl-5,7-dibutoxycoumarine, 3-benzoyl-5,7-di(methoxyethoxy)coumarine, 3-benzoyl-5,7-di (allyloxy)coumarine, 3-benzoyl-7-dimethylaminocoumarine, 3-benzoyl-7-diethylaminocoumarine, 3-isobutyroyl-7-dimethylaminocoumarine, 5,7-dimethoxy-3-(1-naphthoyl)coumarine, 5,7-dimethoxy-3-(1-naphthoyl)coumarine, 3-benzoylbenzo[f]coumarine, 7-diethylamino-3-thienoylcoumarine, or 3-(4-cyanobenzoyl)-5,7-dimethoxycoumarine; or 3-(aroylmethylen) thiazolines, e.g. 3-methyl-2-benzoylmethylennaphthothiazoline, 3-methyl-2-benzoylmethylenbenzothiazoline, or 3-methyl-2-propionylmethylen-p-naphthothiazoline; or other carbonyl compounds, e.g. acetophenone, 3-methoxyacetophenone, 4-phenylacetophenone, 2-acetylnaphthaline, 2-naphthaldehyde, 9,10-anthraquinone, 9-fluorenon, dibenzosuberone, xanthone, 2,5-bis(4-diethylaminobenzylidene) cyclopentanone, 2-(4-dimethylaminobenzylidene)indan-1-one or 3-(4-dimethylaminophenyl)-1-indan-S-yl-propenone, 3-phenylthiophthalimide or N-methyl-3,5-di(ethylthio) phthalimide.

Preference is however given to the thioxanthones, especially to the above substituted thioxanthones.

The photosensitizers are used in an amount of preferably from 0.1 to 3% by weight, in particular from 0.5 to 1.5% by weight, based on the weight of the PLB.

Photolatent acid generators (more frequently termed photoacid generators, PAGs) are compounds which, when photoactivated, release an acid, e.g. a sulfonic acid, sulfinic acid, carboxylic acid, phosphoric acid or hypophosphoric acid. They are based on several types of structures, such as oxime sulfonates, iminosulfonates, esters of sulfonic, sulfinic or carboxylic acids, arene sulfonate dervatives, hydroxyimide sulfonates, phenacyl sulfone derivatives, nitrobenzyl esters, triaryl phosphate derivatives, selenides, organosilane-based compounds, naphthalimides, 1-chloro-substituted thioxanthones, phenols and thianthrenes.

In particular, the PAGs are selected from compounds $A^b$-$Z^b$, where $A^b$ and $Z^b$ are covalently bound, and where $A^b$ is derived from a strong acid selected from aliphatic and aromatic sulfonic acids, and $Z^b$ is a photolytically removable group. More particularly, the PAGs are oxime sulfonates, in particular oxime sulfonates of following formula PAG.1:

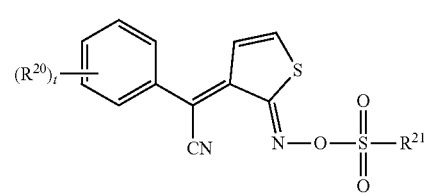

PAG.1 where
each $R^{20}$ is independently selected from $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl and $C_1$-$C_6$-alkoxycarbonyl;

$R^{21}$ is selected from $C_1$-$C_{12}$-alkyl, $C_3$-$C_6$-cycloalkyl and phenyl, where phenyl may carry 1, 2 or 3 substituents selected from $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl and $C_1$-$C_6$-alkoxycarbonyl; and
t is 0, 1, 2, 3, 4 or 5.

In a specific embodiment $R^{20}$ is $C_1$-$C_6$-alkyl, specifically methyl. In a specific embodiment t is 1 and $R^{20}$ is bound ortho to the —C(CN)═ group. In a specific embodiment $R^{21}$ is $C_3$-$C_8$-alkyl or phenyl which may carry one methyl substituent. In a more specific embodiment t is 1, $R^{20}$ is methyl bound ortho to the —C(CN)═ group and $R^{21}$ is $C_3$-$C_8$-alkyl or phenyl which carries one methyl substituent in para position to the sulfonyl group.

The above PAGs become active with UV B and/or UV A radiation.

In another particular embodiment the PAGs are selected from acylphosphine oxides. Acylphosphine oxides are characterized by a C(O) group vicinally bound to a P(O) group. Generally, acylphosphine oxides are considered as "classical" photoinitiators which upon radiation release free radicals. The present inventors observed however that acylphosphine oxides also cure STPs, which cannot be explained by the release of free radicals, as STPs cannot be cured radically. Without wishing to be bound by theory, it is assumed that acylphosphine oxides upon activation (also) release hypophosphoric acids and thus act as PAGs. Therefore, in context of the present invention, they are ranked as PAGs.

Preferred acylphosphine oxides are compounds of formula PAG.2:

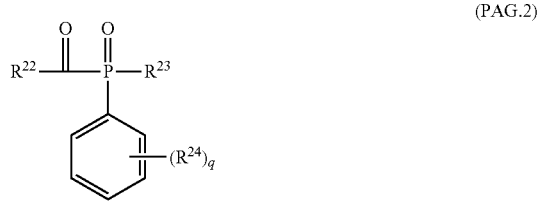

(PAG.2)

where
$R^{22}$ is selected from $C_1$-$C_{10}$-alkyl, $C_1$-$C_{10}$-alkoxy and phenyl which may carry 1, 2, 3, 4 or 5 substituents selected from $C_1$-$C_6$-alkyl and $C_1$-$C_6$-alkoxy;
$R^{23}$ is selected from $C_1$-$C_{10}$-alkyl, $C_1$-$C_{10}$-alkoxy, C(O)$R^{25}$ and phenyl which may carry 1, 2, 3, 4 or 5 substituents selected from $C_1$-$C_6$-alkyl and $C_1$-$C_6$-alkoxy;
$R^{24}$ is selected from $C_1$-$C_6$-alkyl and $C_1$-$C_6$-alkoxy;
$R^{25}$ is selected $C_1$-$C_{10}$-alkyl, $C_1$-$C_{10}$-alkoxy and phenyl which may carry 1, 2, 3, 4 or 5 substituents selected from $C_1$-$C_6$-alkyl and $C_1$-$C_6$-alkoxy; and
q is 0, 1, 2, 3, 4 or 5.

Preferably, $R^{22}$ is phenyl which may carry 1, 2, 3, 4 or 5 substituents selected from $C_1$-$C_6$-alkyl and $C_1$-$C_6$-alkoxy, and is in particular phenyl which carries 3 methyl substituents, specifically 3 methyl substituents in the 2, 4 and 6-positions, relative to the 1-position of the attachment point of the phenyl ring to C(O).

Preferably, $R^{23}$ is selected from $C_1$-$C_6$-alkoxy, C(O)$R^{25}$ and phenyl.

Preferably, $R^{25}$ is phenyl which may carry 1, 2, 3, 4 or 5 substituents selected from $C_1$-$C_6$-alkyl and $C_1$-$C_6$-alkoxy, and is in particular phenyl which carries 3 methyl substituents, specifically 3 methyl substituents in the 2, 4 and 6-positions, relative to the 1-position of the attachment point of the phenyl ring to C(O).

Preferably, q is 0.

In particular, the acylphosphinoxides are selected compounds of formulae PAG.2.1, PAG.2.2 and PAG.2.3:

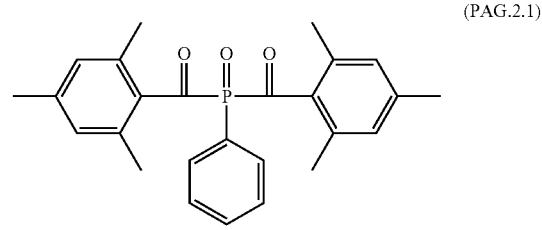

(PAG.2.1)

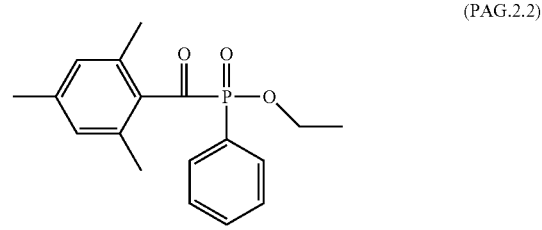

(PAG.2.2)

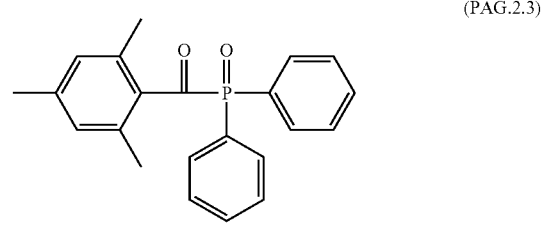

(PAG.2.3)

The above acylphosphine oxides become active with UV C radiation.

In another particular embodiment the PAGs are selected from ionic photoacid generators. Ionic photoacid generators are for example onium salts, such as halonium, specifically iodonium; sulfonium, sulfoxonium, selenium, ammonium, phosphonium or arsonium salts. Their counter-anions are preferably non-coordinating complex anions, such as complex anions of semimetals and metals, e.g. of B, P, As, Sb, Sn, Fe, Bi, Al, Ga, In, Ti, Zr, Sc, Cr, Hf or Cu; and also stabilized carbanions.

Such ionic PAGs are known and described, for example, in U.S. Pat. No. 6,280,911 and the literature cited therein.

Preferably the ionic PAGs are selected from iodonium and sulfonium salts. The iodonium or sulfonium central atom is preferably substituted by at least one aromatic ring, the iodine atom preferably by 2 aromatic rings; the sulfur atom by preferably 3 aromatic rings. The aromatic rings may in turn be substituted, e.g. by one or more $C_1$-$C_{10}$-alkyl, $C_1$-$C_{10}$-alkoxy, $C_1$-$C_{10}$-thioalkyl, $C_1$-$C_4$-alkylcarbonyl, $C_1$-$C_{10}$-alkoxycarbonyl, aryl, aryloxy or arylthio groups, where the aryl groups in the three last-mentioned substituents may in turn carry one or more substituents selected from $C_1$-$C_{10}$-alkyl, $C_1$-$C_{10}$-alkoxy, $C_1$-$C_{10}$-thioalkyl, $C_1$-$C_4$-alkylcarbonyl and $C_1$-$C_{10}$-alkoxycarbonyl.

The counter-anions are preferably selected from $BF_4^-$, $PF_6^-$, $SbF_6^-$, $B(C_6H_6)_4^-$, $B(C_6F_5)_4^-$ and $C(S(O)_2CF_3)_3^-$.

Specific examples for ionic PAGs are salts of formulae PAG.3.1 and PAG.3.2

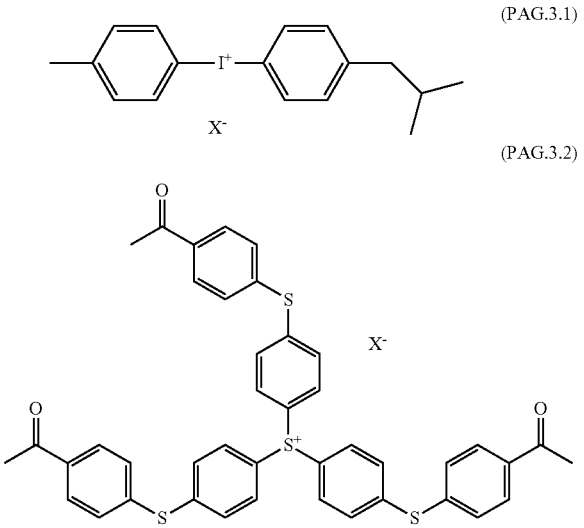

(PAG.3.1)

(PAG.3.2)

where X— is selected from $PF_6^-$, $B(C_6F_5)_4^-$ and $C(S(O)_2CF_3)_3^-$.

Metal-based photoinitiators are complexes of transition metals or of metals of the third or fourth main-group of the periodic table containing at least one photolytically removable ligand. In a preferred embodiment, they are selected from titanium complexes containing at least one photolytically removable ligand.

Photolytically removable ligands are for example acetylacetonate and derivatives thereof, such as the anions of $C_6H_5C(O)CH_2C(O)C_6H_5$ (dbaH) and of $(CH_3)_3CC(O)CH_2C(O)CC(CH_3)_3$; and certain phenyl groups.

Specifically the titanium complexes are selected from $Ti(IV)(acac)_2(OiPr)_2$ and $Ti(0)(phenyl)_2(2,6-difluoro-4-pyrrol-1-yl-phenyl)_2$.

The above metal-based photoinitiators become active with UV B and/or UV A radiation and/or radiation in the visible spectrum.

Photolatent initiators and methods for preparing them are known.

Photoinitiators which are not Photolatent and which Become Active with UV C Radiation Photoinitiators suitable for use according to the invention are in principle any compounds and mixtures that form one or more free radicals when irradiated with UV C radiation. These include initiator systems consisting of a plurality of initiators and systems that function independently of one another or synergistically. In addition to co-initiators, such as amines, thiols, borates, enolates, phosphines, carboxylates and imidazoles, it is also possible to use sensitisers, such as acridines, xanthenes, thiazenes, coumarins, thioxanthones, triazines and dyes. A description of such compounds and initiator systems can be found e.g. in Crivello J. V., Dietliker K. K., (1999): Chemistry & Technology of UV & EB Formulation for Coatings, Inks & Paints, and in Bradley G. (ed.) Vol. 3: Photo-initiators for Free Radical and Cationic Polymerisation 2nd Edition, John Wiley & Son Ltd. The photoinitiators may either have an unsaturated group or not. Suitable photoinitiators are derived, for example, from the following classes of compounds: benzoins, ketals, such as benzil ketals, such as benzil dimethyl ketal (2,2-dimethoxy-1,2-diphenylethan-1-one); acetophenones, halogenated acetophenones, hydroxyketones, such as α-hydroxyketones or hydroxyalkylphenones; aminoalkylphenones, acylphosphine oxides, acylphosphine sulfides, acyloxyiminoketones, alkylamino-substituted ketones, such as Michler's ketone, peroxy compounds, dinitrile compounds, phenylglyoxylates, dimeric phenylglyoxalates, benzophenones, oximes and oxime esters, thioxanthones, coumarins, ferrocenes, titanocenes, onium salts such as sulfonium salts, iodonium salts or diazonium salts; borates, triazines, bisimidazoles, poly-silanes and dyes. It is also possible to use combinations of the compounds from the mentioned classes or combinations with co-initiator systems and/or sensitisers.

Among the above classes and subclasses, preference is given to α-hydroxyketones, phenylglyoxylates and benzil ketals.

Particular α-hydroxyketones are compounds of formulae PI.1, PI.2 and PI.3. A particular phenylglyoxylate is the compound of formula PI.4. A particular benzil ketal is the compound of example PI.5.

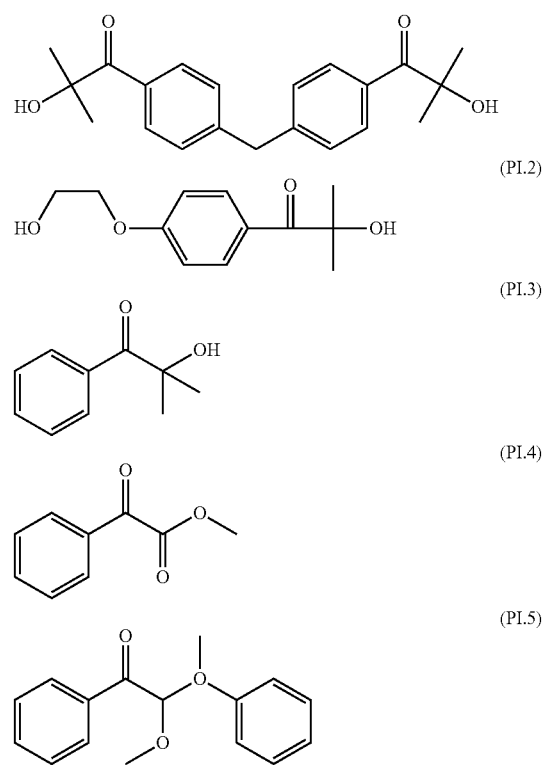

Specifically, one of the above α-hydroxyketones is used. Among the above α-hydroxyketones PI.1, PI.2 and PI.3, PI.3 is specifically used.

Preferably, the at least one photoinitiator (c) is a photolatent latent initiator or a mixture of a photolatent latent initiator and a photoinitiator which becomes active with UV C radiation. With respect to preferred photolatent latent initiators and photoinitiators which becomes active with UV C radiation reference is made to the above preferred embodiments. Specifically, a PLB, in particular one of the above preferred PLBs, or a PAG, in particular one of the above preferred PAGs, is used.

If a mixture of a photolatent latent initiator and a photoinitiator which becomes active with UV C radiation is used the weight ratio of photolatent latent initiator and photoinitiator which becomes active with UV C is preferably in the range of from 1:100 to 100:1, more preferably from 1:50 to 50:1, even more preferably from 1:20 to 20:1, in particular from 1:10 to 10:1.

As said above, the acrylate compound and the STP can be used in any weight ratio, depending on the desired properties of the composition. If rather deeply curable compositions are desired, the acrylate compound predominates, and if rather pressure-sensitive adhesive properties are to prevail, the STP is used in higher amounts. Preferably, the acrylate compound and the STP are used in a weight ratio of from 50:1 to 1:50, more preferably from 20:1 to 1:20, even more preferably from 10:1 to 1:10 and in particular from 10:1 to 1:1.

The photoinitiator (c) and that polymer (a) or (b) which is used in lower amounts are preferably used in a weight ratio of from 1:10 to 1:10000, more preferably from 1:20 to 1:5000, even more preferably from 1:50 to 1:1000 and in particular from 1:100 to 1:500. If polymer (a) and (b) are used in equivalent amounts, the above ratios apply of course to either of them.

The polymer composition may moreover contain one or more further additives (d) which are different from components (a) to (c). The further additives (d) are preferably selected among usual additives for adhesive compositions:
(d.1) antioxidants;
(d.2) light stabilizers;
(d.3) UV absorbers;
(d.4) rheology modifiers;
(d.5) desiccants
(d.6) flame retardants
(d.7) radical scavengers
(d.8) metal deactivators
(d.9) antiozonants
(d.10) peroxide decomposers/scavangers
(d.11) blowing agents
(d.12) antistatics
(d.13) adhesion promoters
(d.14) chelates
(d.15) fillers
(d.16) corrosion inhibitors
(d.17) pigments
(d.18) antifoams
(d.19) curing/crosslinking catalysts different from the above-described photoinitiators (d.1) Antioxidants are for example thioether groups-containing antioxidants, such as the commercially available products Irganox® 1520, Irganox® 1726, Irganox® 1035, Irganox® 565 or DSTDP; phosphorus-containing antioxidants, such as the commercially available products Irgafos® 38, Irgafos® 168, Hostanox® P-EPQ or Weston ODPP; or hindered phenolic compounds, such as the commercially available products Irganox® 245, rganox® 565, Irganox® 1010, Irganox® 1035 (this is simultaneously also a heat stabilizer) Irganox® 1076, Irganox® 1098, Irganox® 1135, Tinuvin® 144 (this is simultaneously also a light stabilizer) or Vulkanox® BHT; etc.

(d.2) Light stabilizers are generally HALS amines (sterically hindered amines). HALS are derivatives of 2,2,6,6-tetraalkyl piperidine, mostly 2,2,6,6-tetramethyl piperidine, and are well known in the art. The secondary nitrogen atom of the piperidine ring may be substituted, e.g. by an alkyl group, which may in turn be substituted, by an alkoxy, alkenyloxy, alkynyloxy, cycloalkoxy, phenyloxy or benzyloxy group, or by a carbonyl or thiocarbonyl group which is either bound directly or flexibly in γ- or δ-position to the nitrogen ring atom so that an intramolecular 5- or 6-membered ring can be formed by interaction of N with the C(=O) or C(=S) group. Examples are the commercially available products Tinuvin® 123, Tinuvin® 144 (this is simultaneously also an antioxidant) Tinuvin® 249, Tinuvin® 292, Tinuvin® 622, Tinuvin® 770, Chimassorb® 944, etc.

(d.3) UV absorbers are for example of the class of triazines, benzophenones, cyanoacrylates, formamidines, oxanilides or benzotriazoles.

In UV absorbers of the class of triazines the triazine ring generally carries at least one hydroxyphenyl ring. For example, the triazine absorber is a compound of formula VII

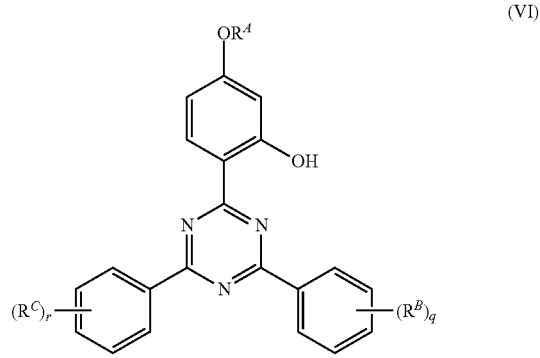

(VI)

where
$R^A$ is selected from hydrogen and $C_1$-$C_{12}$-alkyl which may carry one or more substituents $R^{17}$;
$R^B$ and $R^C$, independently of each other, are selected from $C_1$-$C_{12}$-alkyl which may carry one or more substituents $R^{17}$; OH and $C_1$-$C_{12}$-alkoxy, where the alkyl moiety in alkoxy may carry one or more substituents $R^{17}$;
each $R^{17}$ is independently selected from OH and $C_1$-$C_{20}$-alkoxy; and
q and r, independently of each other, are 0, 1 or 2.

A commercial example therefor is Tinuvin® 400.

UV absorbers of the class of benzophenones are generally hydroxybenzophenones. These include for example 2-hydroxybenzophenones such as 2-hydroxy-4-methoxybenzophenone, 2,2'-dihydroxy-4-methoxybenzophenone, 2,4-dihydroxy-benzophenone, 2,2',4,4'-tetrahydroxybenzophenone, 2,2'-dihydroxy-4,4'-dimethoxybenzophenone, 2,2'-dihydroxy-4,4'-dimethoxybenzophenone, 2-hydroxy-4-(2-ethyl-hexyloxy)benzophenone, 2-hydroxy-4-(n-octyloxy) benzophenone, 2-hydroxy-4-methoxy-4'-methylbenzophenone, 2-hydroxy-3-carboxybenzophenone, 2-hydroxy-4-methoxybenzophenone-5-sulfonic acid and its sodium salt, and 2,2'-dihydroxy-4,4'-dimethoxybenzophenone-5,5'-bissulfonic acid and its sodium salt.

UV absorbers of the class of cyanoacrylates are generally diphenylcyanoacrylates. These include for example ethyl 2-cyano-3,3-diphenylacrylate, obtainable commercially for example under the name Uvinul® 3035 from BASF AG, Ludwigshafen, 2-ethylhexyl 2-cyano-3,3-diphenylacrylate, obtainable commercially for example as Uvinul® 3039 from BASF AG, Ludwigshafen, and 1,3-bis[(2'-cyano-3',3'-diphenylacryloyl)oxy]-2,2-bis{[2'-cyano-3',3'-diphenylacryloyl) oxy]methyl}propane, obtainable commercially for example under the name Uvinul® 3030 from BASF AG, Ludwigshafen.

Oxanilides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, and also mixtures of ortho-, para-methoxy-disubstituted oxanilides and mixtures of ortho- and para-ethoxy-disubstituted oxanilides.

Benzotriazoles includes for example 2-(2'-hydroxyphenyl)-benzotriazoles such as 2-(2'-hydroxy-5'-methylphenyl)benzotriazole, 2-(3',5'-di-tert-butyl-2'-hydroxy-phenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl) benzotriazole, 2-(3',5'-di-tert-amyl-2'-hydroxyphenyl)-benzotriazole, 2-(3',5'-bis-(α,α-dimethyl benzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole and 2-(3'-tert-butyl-2'-hydroxy-5'-(2-isooctyloxy-carbonylethyl)phenylbenzotriazole, 2,2'-methylenebis[4-(1,1,3,3-tetramethylbutyl)-6-benzotriazol-2-ylphenol]; the product of esterifying 2-[3'-tert-butyl-5'-(2-methoxycarbonylethyl)-2'-hydroxyphenyl]-2H-benzotriazole with polyethylene glycol 300; [R—CH$_2$CH$_2$—COO (CH$_2$)$_3$]$_2$ where R=3'-tert-butyl-4'-hydroxy-5'-2H-benzotriazol-2-ylphenyl, and mixtures thereof.

Among the above UV absorbers, preference is given to the trazines, especially to the above compounds VI, and even more to the benzotriazoles, especially to 2-(2'-hydroxyphenyl)-benzotriazoles, specifically to 2-(2'-hydroxy-5'-methylphenyl)-benzotriazole.

(d.4) Rheology modifiers are for example thixotropic agents, like polyamide waxes, hydrogenated castor oil derivatives, metal soaps (e.g. calcium, barium or aluminum stearate), fatty acid amides and swellable polymers like PVC.

(d.5) Desiccants are for example silica, zeolithes, calcium sulfate, sodium sulfate and various silanes, such as vinylsilanes (e.g. vinyltrimethoxysilane), oxime silanes, benzamidosilanes, carbamatosilanes and alkoxysilanes.

(d.6) Flame retardants are for example halogen containing compounds such as tetrabromobisphenol A, decabromodiphenyl oxide, decabromodiphenyl ethane, brominated carbonate oligomers, brominated epoxy oligomers, and poly (bromostyrenes). Further examples are the hydroxides, oxides and oxide hydrates of group 2, 4, 12, 13, 14 and 15 (semi)metals, such as magnesium oxide or hydroxide, aluminium oxide, aluminum trihydrate, silica, tin oxide, antimony oxide (111 and V) and oxide hydrate, titanium oxide and zinc oxide or oxide hydrate; nitrogen-based flame retardants, such as melamine and urea based resins and melamine cyanurate, melamine phosphates, melamine polyphosphates and melamine borate; and phosphorous-based flame retardants, such as ammonium polyphosphates, phosphoric esters, in particular triarylphosphates, such as triphenyl phosphate, tribenzyl phosphate, tricresyl phosphate, tri-(dimethylphenyl) phosphate, benzyl dimethylphosphate, di-(dimethylphenyl) phenyl phosphate, resorcinol-bis(di-phenyl phosphate), recorcinol-bis-[di-(2,6-dimethylphenyl)-phosphate] (PX-200), aluminum diethylphosphinate (Exolit® OP 1230), but also aliphatic phosphates, such as tris(2-chloroisopropyl)phosphate (Lupragen® TCPP), aromatic polyphosphates, e.g. polyphosphates derived from bisphenols, such as the compounds described in US 2004/0249022), and phosphonic esters, such as dimethyl-methyl phosphonate and phosphonic acid (2-((hydroxymethyl)carbamyl)ethyl) dimethylester, and polycyclic phosphorous-containing compounds, such as 9,10-dihydro-9-oxa-10-phosphaphenanthrene-10-oxide (DOPO).

(d.7) Radical scavengers are for example nitroxyl compounds, such as 2,2,6,6-tetramethylpiperidinyloxyl (TE- MPO) and derivatives thereof or hydroxylamines, such as NRR'OH, where R and R', independently of each other, are long-chain alkyl groups, e.g. alkyl groups with 4 to 20 carbon atoms; aryl amines, e.g. diphenyl amines in which at least one of the phenyl rings carries a $C_1$-$C_{10}$-alkyl group; or quinone compounds.

(d.8) Metal deactivators are, for example, salicylic acid derivatives such as N,N'-disalicylidene-1,2-propanediamine, N-salicylal-N'-salicyloyl hydrazine, N,N'-bis(salicyloyl)hydrazine, 3-salicyloylamino-1,2,4-triazole, N,N'-bis (salicyl-oyl)oxalyl dihydrazide, or N,N'-bis(salicyloyl) thiopropionyl dihydrazide; hydrazine derivatives, such as N,N-bis(3,5-di-tert-butyl-4-hydroxyphenylpropionyl)hydrazine, bis(benzylidene)oxalyl dihydrazide, isophthaloyl dihydrazide, sebacoyl bisphenylhydrazide, or N,N'-diacetyladipoyl dihydrazide, further N,N'-diphenyloxamide or oxanilide, and moreover benzotriazoles or tolutriazoles, as commercialized under the Irgamet® brand of BASF.

(d.9) Antiozonants are added in order to slow the deterioration of the finished product caused by exposure to ozone. Examples are p-phenylenediamines such as 6PPP (N-(1,3-dimethylbutyl)-N'-phenyl-p-phenylenediamine) or IPPD (N-isopropyl-N'-phenyl-p-phenylenediamine); 6-ethoxy-2, 2,4-trimethyl-1,2-dihydroquinoline (ETMQ), ethylene diurea (EDU), nickel dibutyl dithiocarbamate or paraffin waxes, such as Akrowax® 195.

(d.10) Peroxide deactivators (decomposers/scavangers) are for example esters of 3-thiodipropionic acid, for example, the lauryl, stearyl, myristyl or tridecyl ester, mercaptobenzimidazole or the zinc salt of 2-mercaptobenzimidazole, zinc dibutyldithiocarbamate, dioctadecyl disulfide, and pentaerythritol tetrakis(P3-dodecylmercapto)propionate.

(d.11) Suitable blowing agents are chemical blowing agents, which are compounds which decompose at elevated temperature to release gas. Examples are chlorinated paraffin waxes, carbamoyliminourea or [(4-methylphenyl)sulfonylamino]urea.

(d.12) Antistatics are used for reducing or eliminating buildup of static electricity. The antistatic agent makes the surface or the material itself slightly conductive, either by being conductive itself, or by absorbing moisture from the air; therefore, some humectants are suitable. The molecules of an antistatic agent often have both hydrophilic and hydrophobic areas. Examples are long-chain aliphatic amines (optionally ethoxylated) and amides, quaternary ammonium salts (e.g., behentrimonium chloride or cocamidopropyl betaine), esters of phosphoric acid, polyethylene glycol esters, or polyols; further carbon black, conductive fibers, or nanomaterials; ionic liquids or a solution of a salt in an ionic liquid; moreover indium tin oxide.

(d.13) An adhesion promoter is understood to be a substance which improves the adhesion properties (tack or stickiness) of adhesive layers on surfaces; such compounds are also known as tackifiers. Usually they are low-molecular weight compounds with high glass transition temperature. Examples for adhesion promotors useful in sealant compositions are silane adhesion promoters, in particular aminosilanes, e.g. 3-aminopropyltrimethoxysilane, and also polyethyleneimines, especially polyethyleneimines with a weight average molecular weight of at most 10000, in particular at most 5000. Examples for adhesion promotors useful in adhesive compositions are resins, terpene oligomers, coumarone/indene resins, aliphatic, petrochemical resins and modified phenolic resins. Suitable within the framework of the present invention are, for example, hydrocarbon resins, as obtained by polymerization of terpenes, principally α- or β-pinene, dipentene or limonene. The polymerization of these monomers generally takes place cationically with initiation by Friedel-Crafts catalysts. The terpene resins also include copolymers of terpenes and other monomers, e.g. styrene, α-methylstyrene, isoprene and the like. The above resins are used e.g. as adhesion promoters for pressure-sensitive adhesives and coating materials. Also suitable are the terpene-phenolic resins which are produced by acid-catalyzed addition of phenols to terpenes or rosin. Further, rosins and derivatives thereof, for example their esters or alcohols, are suitable as adhesion promoters in the above sense. Silane adhesion promoters, in particular aminosilanes, e.g. 3-aminopropyltrimethoxysilane, are also suitable; as well as polyethyleneimines, especially polyethyleneimines with a weight average molecular weight of at most 10000, in particular at most 5000.

(d.14) Chelates serve for binding metals which may otherwise influence the properties of the composition of the invention in an unintentional way at an inappropriate time. Examples are acetylacetone (acac), ethylenediamine (en), 2-(2-aminoethylamino)ethanol (AEEA), diethylenetriamine (dien), iminodiacetate (ida), triethylenetetramine (trien, TETA), triaminotriethylamine (tren), nitrilotriacetate (nta), bis(salicyliden)ethylenediamine (salen), ethylenediaminotriacetate (ted), ethylenediaminetetraacetate (EDTA), diethylenetriaminepentaacetate (DTPA), 1,4,7,10-tetraazacyclododecan-1,4,7,10-tetraacetate (DOTA), oxalate (ox), tartrate (tart), citrate (cit), dimethylglyoxim (dmg), 8-hydroxyquinoline (oxin), 2,2'-bipyridine (bpy), 1,10-phenanthroline (phen), dimercaptosuccinic acid (DMSA) or 1,2-bis(diphenylphosphino)ethane (dppe).

(d.15) Fillers are for example inorganic fillers like calcium carbonate, e.g. in the form of chalk or lime dust; talc, clay, sand, quartz, flint, mica, glass powder and other ground mineral substances, ceramic microspheres, precipitated or pyrogenic silica, zeolithes, bentonites, kaolin, kieselguhr, metal oxides like titanium, iron or zinc oxide; mixed oxides of silicium and aluminum; barium sulfate, silicium nitride, silicium carbide, boron nitride, carbon black; or organic fillers like graphite powder, wood flour, sawdust, ground walnut shells and other chopped fibers like cellulose or cotton fibers.

(d.16) Corrosion inhibitors are for example the alkali metal or (substituted) ammonium salts or polycarboxylic acid, such as the salts of sebacic acid or tris(carboxyalkylamino)-1,3,5-triazines; or N-acylsarcosines. These compounds are commercialized under the Irgacor@ brand of BASF.

(d.17) Pigments are for example titanium dioxide, iron oxides or carbon black.

(d.18) Antifoams or antifoaming agents of defoamers are intended to stop or suppress foaming during processing. Typically silicones, such as dimethylsilicones, are used.

(d.19) Curing/crosslinking catalysts different from the above-described photoinitiators are for example tin-based catalysts, such as dibutyltin dilaurate (DBTL), dibutyltin dioctoate or dibutyltin diacetylacetonate, or organozinc compounds.

Among the above additional components (d) preference is given to desiccants, especially vinyl silanes, and adhesion promotors, especially rosin esters.

In a preferred embodiment the composition of the invention contains following components in following ratios:
(a) at least one acrylate compound: 1 to 98% by weight;
(b) at least one silyl-terminated polymer: 1 to 98% by weight;
(c) at least one photoinitiator: 0.0001 to 9% by weight;
(d) at least one further additive: 0 to 98% by weight.

The percentages by weight are based on the total weight of the composition. The weights from (a) to (d) add up to 100% by weight.

(d) is present in high amounts only if it comprises a filler.

In a more preferred embodiment the composition of the invention contains following components in following ratios:
(a) at least one at least one acrylate compound: 30 to 90% by weight;
(b) at least one silyl-terminated polymer: 5 to 69.995% by weight;
(c) at least one photoinitiator: 0.005 to 5% by weight;
(d) at least one further additive: 0 to 20% by weight.

In a particular embodiment the composition of the invention contains following components in following ratios:
(a) at least one at least one acrylate compound: 50 to 90% by weight;
(b) at least one silyl-terminated polymer: 5 to 49.95% by weight;
(c) at least one photoinitiator: 0.05 to 5% by weight;
(d) at least one further additive: 0 to 10% by weight.

In one preferred embodiment, the composition of the invention is liquid at 25° C. and 1013 mbar and contains at most 5% by weight, in particular at most 2% by weight, based on the total weight of the composition, of solvents. This allows applying the composition in very convenient ways, for example even by spray application, without the necessity of heating and without the necessity to remove solvents. A further advantage is that the composition can be applied to thermally sensitive substrates. Hot melt adhesives cannot be applied to thermally sensitive substrates which would be damaged or even destroyed the temperature of the melt. Moreover, the composition can be applied to substrates sensitive to solvents, especially organic solvents.

"Liquid at 25° C. and 1013 mbar" in the terms of the present invention means that the composition has a viscosity of at most 250 Pa·s at 25° C. and 1013 mbar, as measured with a CAP 2000+ Viscometer (Brookfield), cone 4, according to DIN EN ISO 3219, annex B at a shear rate of 100 $s^{-1}$. In particular, the composition has a viscosity of at most 200 Pa·s at 25° C., in particular a viscosity of at most 150 Pa·s at 25° C., more particularly a viscosity of at most 100 Pa·s at 25° C., even more particularly a viscosity of at most 50 Pa·s at 25° C., specifically a viscosity of at most 10 Pa·s at 25° C., and very specifically a viscosity of at most 1 Pa·s at 25° C. The viscosities relate to values as obtained with the method described above.

"Solvent" is a liquid substance that dissolves a solute (a chemically different liquid, solid or gas), resulting in a solution. In terms of the present invention, the solvent is not restricted to a compound or medium which dissolves the solutes in the proper sense: This compound or medium may be more generally a dispersing medium, and thus the "solution" might be a suspension, emulsion or a solution in the proper sense (i.e. a homogeneous mixture composed of two or more substances, where the particles of the solute cannot be seen by naked eye and which does not scatter light). As used above, the term "solvent" does not include any of components (a) to (c), even if these are liquid and may principally act as a solvent for one or more of the other components. As used above, this term includes only liquid substances which are different from components (a) to (c) and are able to dissolve a solute.

In another preferred embodiment, the composition of the invention is a hot melt composition at 25° C. and 1013 mbar. Consequently, the composition is solid at 25° C. and 1013 mbar.

"Solid at 25° C. and 1013 mbar" in the terms of the present invention means that the composition has a viscosity of more than 250 Pa·s at 25° C. and 1013 mbar, as measured with a CAP 2000+ Viscometer (Brookfield), cone 4, according to DIN EN ISO 3219, annex B at a shear rate of 100 s$^{-1}$. In particular, the composition has a viscosity of at least 5 Pa·s at 130° C., e.g. from 5 to 100 Pa·s at 130° C., more particularly of at least 20 Pa·s at 130° C., e.g. from 20 to 70 Pa·s at 130° C., as determined according to EN ISO 3219, appendix B, cone and plate, shear rate 100 s$^{-1}$.

Whether the composition is liquid or solid is mainly determined by the acrylate compound and to be more precise mostly by its molecular weight. Compositions containing acrylate compounds with a $M_w$ of above 100000 are rather solid, while compositions containing acrylate compounds with a $M_w$ of below 100000 are rather liquid.

In a particular embodiment, the composition of the invention is characterized by not containing any curing/crosslinking catalyst based on tin (e.g. the usually present dibutyltin dilaurate (DBTL) or dibutyltin dioctoate or dibutyltin diacetylacetonate) and more particularly by not containing any metal-based curing/crosslinking catalyst.

The composition is prepared by principally known methods, such as intimately mixing the components, either simultaneously or consecutively, in suitable dispersing units, such as mixers, in particular high-speed mixers, planetary mixers, internal mixers, compounders, twin-screw-extruders etc.

The invention further relates to the use of the polymer composition according to the invention as or in an adhesive, a sealant, liquid gasket, knifing filler or coating composition.

The invention also relates to an adhesive composition, or a sealant composition, or a liquid gasket composition, or a knifing filler composition or a coating composition comprising the polymer composition according to the invention.

Some applications for the adhesive compositions of the present invention are for example specialty tapes, structural tapes or precoated articles.

The composition of the invention unifies both controllable adhesive forces at the beginning of the bonding process and subsequent development of strong adhesive and cohesive forces. As the two main components (a) and (b) are miscible at arbitrary ratios, the adhesion characteristics—more pronounced pressure-sensitive adhesion properties or rather more pronounced strong cohesion properties—can be fine-tuned for the specific application. The adhesive layers produced with the composition of the invention can be through-cured up to a thickness of 500 μm or even up to a thickness of 1 mm.

The invention is now illustrated by the following examples.

EXAMPLES

Materials Used:

| | |
|---|---|
| Geniosil ® STP-E 35: | a trimethoxysilylpropylcarbamate-terminated polyether polymer from Wacker |
| Geniosil ® STP-E 10: | a dimethoxy(methyl)silylmethylcarbamate-terminated polyether polymer from Wacker |
| acResin ® A 204 UV: | a copolymer of butylacrylate and 2-ethylhexylacrylate containing ca. 0.5% by weight, relative to the weight of the polymer, of copolymerized benzophenone acrylate (i.e. repeating units of formula I where $R^\alpha$ is a benzophenone group as depicted above in formula $R^\alpha.1$, wherein L is a $(CH_2)_4$—O—C(O)—O— group (O bound to the phenyl ring) and m = 0); Mw = 200000; K value (1% solution in THF; DIN ISO 1628-1): 48-52; viscosity: 20-55 Pa · s at 130° C. as determined according to EN ISO 3219, appendix B, cone and plate, shear rate 100 s$^{-1}$; from BASF |
| acResin ® A 260 UV | a butylacrylate polymer containing ca. 0.5% by weight, relative to the weight of the polymer, of copolymerized benzophenone acrylate (i.e. repeating units of formula I where $R^\alpha$ is a benzophenone group as depicted above in formula $R^\alpha.1$, wherein L is a $(CH_2)_4$—O—C(O)—O— group (O bound to the phenyl ring) and m = 0); $M_w$ = 200000, K-value (1% solution in THF; DIN ISO 1628-1): 48-52; viscosity: 30-70 Pa · s at 130° C. as determined according to EN ISO 3219, appendix B, cone and plate, shear rate 100 s$^{-1}$; from BASF |
| Efka ® RM 1920 | hydrogenated castor oil; rheology modifier (thickener) from BASF SE |
| PLB1a | photolatent base of formula PLB.1 (s = 1, $R^{18}$ = methoxycarbonyl bound in para-position, $R^{19}$ = H) yielding DBN (1,5-diazabicyclo[4.3.0]non-5-ene) upon activation |
| PLB1b | photolatent base of formula PLB.1 (s = 0, $R^{19}$ = H) yielding DBN (1,5-diazabicyclo[4.3.0]non-5-ene) upon activation |
| Irgacure ® 369 | photolatent base; 2-benzyl-2-dimethylamino-1-(4-morpholino-phenyl)-butanone-1; compound of formula PLB.6; from BASF |
| Irgacure ® 121 | photolatent acid generator; compound of formula PAG.1, wherein t is 1 with $R^{20}$ = methyl bound in ortho-position to the attachment point of the phenyl ring and $R^{21}$ = 4-methylphenyl; from BASF |

| | |
|---|---|
| Irgacure ® 2022 | mixture of 20% bis(2,4,6-trimethylbenzoyl)-phenylphosphineoxide (compound of formula PAG.2 wherein $R^{22}$ = 2,4,6-trimethylphenyl, $R^{23}$ = —C(O)—trimethylphenyl and q = 0) and 80% 2-hydroxy-2-methyl-1-phenyl-1-propanone (compound of formula PI.3); from BASF |
| Irgacure ® 2100 | highly efficient liquid curing agent to initiate radical polymerization based on a combination of Irgacure 819 (bis(2,4,6-trimethylbenzoyl)-phenylphosphine oxide) with proprietary other photoinitiator |
| Solyfast ® 0010 | Ti(IV)(acac)$_2$(OiPr)$_2$ |
| Foral ® 85-E | hydrogenated rosin ester; a tackifier; from Eastman |
| VTMO | vinyltrimethoxysilane; a desiccant; from Wacker |
| VTMOEO | vinyltris(2-methoexethoxy)silane from Wacker |

Compositions

The compositions were prepared by intimately mixing the components at 120° C., in the relative amounts given in the following tables. The amounts are given in parts by weight.

Test Methods

The structural testings were performed as follows:

Cohesion, i.e. mechanical strength data (shear strength) was determined according to ISO 4587:2003 by a tensile strength tester from Zwick Roell/Z010.

Tack was tested using a probe tack tester (Testing Machines Inc., machine 80-02-01) according to ASTM D2979-95 (DIN 55405). Results were converted from grams to N/25 mm².

Test samples were prepared on beech substrates. Formulations were applied at 120° C. and the test pieces were pressed for 30 sec at 80 N on 40×20 mm² (corresponds to 0.1 N/mm²).

UV cure was performed in a UV Tunnel from IST Metz GmbH Anlagen GmbH, type M-40-2×1-TR-CMK-SLC with 2 lamps of the type M 400 U2L/LA (UV 180-450 nm).

Dry-over times were taken from surfaces which were sanded. The surface was considered to be still tacky if the sand stayed. If the sand could be removed by pressured air, the surface was considered as tack-free.

Results

TABLE 1

Adhesion properties (tack)

| Components | Cmp. | Cmp. | Cmp. | Inv. | Cmp. | Inv. |
|---|---|---|---|---|---|---|
| acResin ® A 204 UV | 100 | 100 | 75 | 75 | 75 | 75 |
| Geniosil ® STP-E 35 | 0 | 0 | 25 | 25 | 0 | 0 |
| Geniosil ® STP-E 10 | 0 | 0 | 0 | 0 | 25 | 25 |
| PLB1a | 0 | 0.1 | 0 | 0.1 | 0 | 0.1 |
| Tack [N/25 mm] after UV radiation with 40 mJ/cm² | 21 | 20 | 18 | 12 | 11 | 0 |

TABLE 2

Tack and mechanical strength after different UV exposures

| Components | Null | Null | Cmp. | Cmp. | Cmp. | Inv. | Inv. | Inv. |
|---|---|---|---|---|---|---|---|---|
| Foral ® 85-E | 0 | 0 | 15 | 15 | 15 | 0 | 0 | 0 |
| acResin ® A 204 UV | 100 | 0 | 85 | 85 | 85 | 85 | 85 | 85 |
| Geniosil ® STP-E 10 | 0 | 100 | 0 | 0 | 0 | 15 | 15 | 15 |
| PLB1a | 0 | 0.1 | 0 | 0.1 | 0.1 | 0 | 0.1 | 0.1 |
| Exposed to UV (mJ/cm²) | 80 | 0.9 | 0 | 40 | 80 | 0 | 40 | 80 |
| Tack [N/25 mm] | 22 | 0 | 21 | 18 | 14.8 | 33.6 | 14.9 | 10.3 |
| Shear strength [N/mm²] | 0.08 | 1.29 | 0.03 | 0.17 | 0.2 | 0.05 | 0.19 | 0.24 |

TABLE 3

Mechanical Strength after exposure at 80 mJ/cm² with different photoinitiators

| Components | Null | Cmp. | Cmp. | Inv. | Inv. |
|---|---|---|---|---|---|
| acResin ® A 204 UV | 100 | 100 | 100 | 75 | 75 |
| Geniosil ® STP-E 35 | 0 | 0 | 0 | 20 | 20 |
| VTMO | 0 | 0 | 0 | 5 | 5 |
| Irgacure ® 2022 | 0 | 1 | 0 | 1 | 0 |
| Irgacure ® 369 | 0 | 0 | 1 | 0 | 1 |
| Shear strength after 1 d [N/mm²] | 0.05 | 0.05 | 0.05 | 0.05 | 0.4 |
| Shear strength after 5 d [N/mm²] | 0.08 | 0.093 | 0.1 | 0.2 | 0.6 |

Null: No additives

Cmp.: Comparative example

Inv.: Example according to the invention

As can be seen, the compositions of the invention lead to distinctly stronger and less tacky adhesive films.

Pressure sensitive adhesive (PSA) testing was performed as follows:

In a second series PSA testing was applied: 60 g of formulation were coated to PET foil (coating thickness: 60 g/m²). The so treated foils were subjected to UV exposure (UV dose: 30 mJ/cm²). The test samples were aged overnight and allowed to cure for 14 days. Shear measurement was carried out according to FINAT TM 8 (3.2 g/mm²). Shear adhesion failure temperature (SAFT) was determined according to PSTC 17 (Pressure Sensitive Tapes Council). Peel test was performed according to FINAT TM 1 and 2.

TABLE 4

Pressure sensitive adhesion

| Components | Cmp. | Inv. | Inv. | Inv. | Inv. |
|---|---|---|---|---|---|
| acResin ® A 204 UV | 100 | 75 | 75 | 75 | 75 |
| Geniosil ® STP-E 35 | 0 | 20 | 20 | 20 | 20 |
| PLB1b | 0 | 0 | 1 | 0 | 1 |
| Irgacure ® 369 | 0 | 1 | 0 | 1 | 0 |
| VTMO | 0 | 5 | 5 | 0 | 0 |
| VTMOEO | 0 | 0 | 0 | 5 | 5 |
| Shear after 14 d [min] | 732 | >12000 | >12000 | >12000 | >12000 |

TABLE 5

Pressure sensitive adhesion

| Components | Cmp. | Inv. |
|---|---|---|
| acResin ® A 260 UV | 100 | 75 |
| Geniosil ® STP-E 35 | 0 | 25 |
| Irgacure ® 369 | 0 | 1 |
| VTMO | 0 | 5 |
| Shear after 14 d [min] | 996 | 4668 |
| SAFT [° C.] | 96 | >180 |

Cmp.: Comparative example

Inv.: Example according to the invention

As can be seen, the compositions of the invention lead to distinctly increased cohesive values, as reflected in the shear values, and to distinctly increased shear adhesion failing temperatures.

We claim:

1. A hardenable polymer composition, comprising
   (a) at least one acrylate compound;
   (b) at least one silyl-terminated polymer; and
   (c) at least one photoinitiator,
   wherein the acrylate compound is an acrylate polymer containing an acrylic acid ester in polymerized form as main component of the polymer,
   wherein the acrylate polymer is at least one selected from the group consisting of an acrylate polymer containing at least one functional group prone to photoinitiation;
   wherein the functional group prone to photoinitiation is derived from a benzophenone group.

2. The polymer composition according to claim 1, wherein the acrylate polymer containing a functional group prone to photoinitiation comprises
   at least 60 mol-%, relative to 1 mol of the polymer, of repeating units of the following formula I:

$$\mathrm{-\!\!\!\!+\!\!CH_2\!-\!CH\!\!+\!\!\!\!-}$$
$$\underset{R^\alpha}{\overset{}{\underset{|}{O}}}\overset{O}{\underset{}{\|}}$$

(I)

where in a part of the repeating units radical $R^\alpha$ is $C_1$-$C_{10}$-alkyl and in another part of the repeating units is a group of formula $R^\alpha.1$ ($R^\alpha.1$)

# is an attachment point to the remainder of the molecule;
L is a bond or a spacer group of $C_1$-$C_8$-alkylene which is optionally bound to the phenyl ring via a linking group selected from the group consisting of —O—, —O—C(O)—, —C(O)—O—, —O—C(O)—O—, —NH—, —NH—C(O)—, —C(O)—NH—, —NH—C(O)—NH—, —O—C(O)—NH— and —NH—C(O)—O—;
$R\gamma$ is OH, $C_1$-$C_6$-alkyl or $C_1$-$C_6$-alkoxy; and
m is 0, 1, 2, 3, 4 or 5; and
optionally repeating units of formulae II, III and/or IV:

(II)

(III)

(IV)

where $R^\alpha$ is independently as defined above.

3. The polymer composition according to claim 2, wherein the acrylate polymer containing a functional group prone to photoinitiation comprises
   from 80 to 99.9 mol-% of repeating units of the formula I wherein $R^\alpha$ is $C_1$-$C_{10}$-alkyl;
   from 0.01 to 20 mol-% of repeating units of the formula I wherein $R^\alpha$ is a benzophenone group of formula $R^\alpha.1$; and
   from 0 to 15 mol-% of repeating units of formula III;
   relative to 1 mol of the polymer,
   wherein the mol percentages of repeating units of the formula I wherein $R^\alpha$ is $C_1$-$C_{10}$-alkyl, repeating units of the formula I wherein $R^\alpha$ is a benzophenone group, and repeating units of the formula III essentially sum up to 100 mol-%.

4. The polymer composition according to claim 1, wherein the acrylate compound has a weight average molecular weight of more than 30000.

5. The polymer composition according to claim 1, wherein the silyl-terminated polymer is a polymer of formula I $$[(R')_a(R''O)_{3-a}Si\text{-}L^1\text{-}Y]_b\text{-}Po \qquad (I)$$

where
Po is a di-, tri- or tetravalent radical of a base polymer;
each Y is independently selected from the group consisting of a bond, —NH—C(=O)—O—, —O—C (=O)—NH—, —C(=O)—NH—L²-NH—C(=O)—NH—, —NH—C(=O)—NH—L²-NH—C(=O)—, —O—C(=O)—, —C(=O)—O—, —NH—C(=O)—S—, —S—C(=O)—NH—and —O—;

R' and R", independently of each other and independently of each occurrence, are $C_1$-$C_6$-alkyl;

$L^1$ is $C_1$-$C_3$-alkylene;

$L^2$ is a divalent aliphatic, cycloaliphatic or aromatic radical;

each a is independently 0 or 1; and b is 2, 3 or 4.

6. The polymer composition according to claim 5, wherein Po is the di-, tri- or tetravalent radical of a polymer selected from the group consisting of a polyether, a polyester, a polyamide, a polyimine, a polyurethane, a poly(meth)acrylate, a polyvinylester, a polyolefin and a mixture thereof.

7. The polymer composition according to claim 6, wherein Po is the divalent radical of a polyether.

8. The polymer composition according to claim 5, wherein

Y is —NH—C(=O)—O—;

R' and R", independently of each other and independently of each occurrence, are methyl or ethyl; and each $L^1$ is independently —$CH_2$— or $C_3$-alkylene.

9. The polymer composition according to claim 1, wherein the at least one photoinitiator is a photolatent initiator which becomes active with UV C radiation, UV B radiation, UV A radiation and/or radiation in the visible range; a photoinitiator which is not photolatent and which becomes active with UV C radiation; or a mixture of said photolatent latent initiator and said photoinitiator which becomes active with UV C radiation.

10. The polymer composition according to claim 9, wherein the at least one photoinitiator is a photolatent initiator or a mixture of a photolatent latent initiator and a photoinitiator which is not photolatent and which becomes active with UV C radiation.

11. The polymer composition according to claim 9, wherein the at least one photoinitiator is a photolatent initiator, which is selected from the group consisting of a photolatent base, a photolatent acid generator and a photolatent metal-based initiator.

12. The polymer composition according to claim 11, wherein the photolatent initiator is a photolatent base, which is a $B^a$—$Z^a$ compound, where $B^a$ and $Z^a$ are covalently bound, and where $B^a$ is derived from a base selected from the group consisting of an amidine, a guanidine and a secondary amine, and $Z^a$ is a photolytically removable group; or a photolatent acid generator, which is a $A^b$-$Z^b$ compound, where $A^b$ and $Z^b$ are covalently bound, and where $A^b$ is derived from an acid selected from the group consisting of an aliphatic sulfonic acid and an aromatic sulfonic acid, and $Z^b$ is a photolytically removable group; or an acylphosphine oxides; or an ionic photoacid generator; or a metal-based initiator, which is a titanium complex containing at least one photolytically removable ligand.

13. The polymer composition according to claim 12, wherein the photolatent initiator is a photolatent base, which is a compound of formulae PLB.1 to PLB.7:

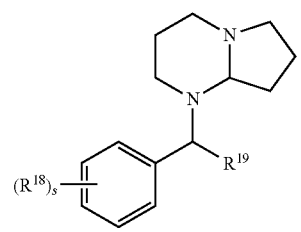

PLB.1

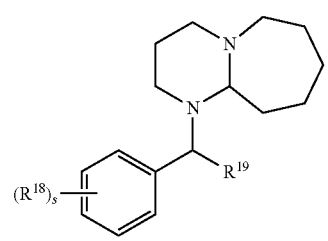

PLB.2

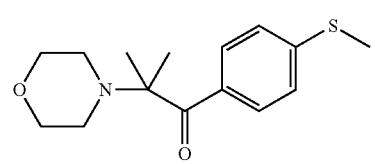

PLB.3

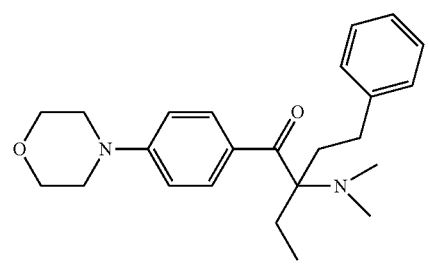

PLB.4

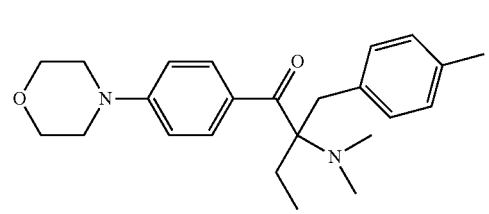

PLB.5

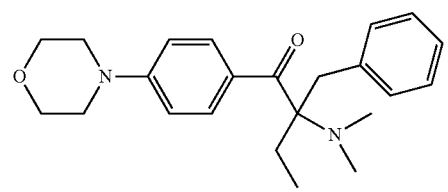

PLB.6

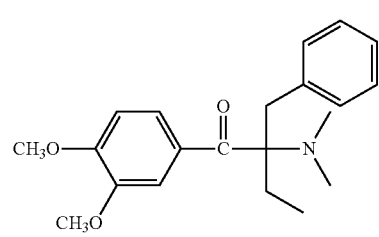

PLB.7 where
each $R^{18}$ is independently $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_6$-alkylcarbonyl or $C_1$-$C_6$-alkoxycarbonyl;

$R^{19}$ is hydrogen or $C_1$-$C_4$-alkyl; and s is 0, 1, 2, 3, 4 or 5.

14. The polymer composition according to claim 13, wherein the photolatent base is a compound of formula PLB.1, PLB.2, PLB.4, PLB.5, PLB.6 or PLB.7.

15. The polymer composition according to claim 12, wherein the photolatent initiator is a photolatent acid generator, which is an acylphosphine oxide of formula PAG.2

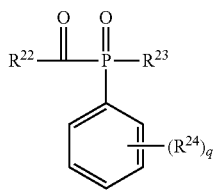

(PAG.2)

where $R^{22}$ is $C_1$-$C_{10}$-alkyl, $C_1$-$C_{10}$-alkoxy or phenyl which optionally comprises 1, 2, 3, 4 or 5 substituents selected from the group consisting of $C_1$-$C_6$-alkyl and $C_1$-$C_6$-alkoxy;

$R^{23}$ is $C_1$-$C_{10}$-alkyl, $C_1$-$C_{10}$-alkoxy, $C(O)R^{25}$ or phenyl which optionally comprises 1, 2, 3, 4 or 5 substituents selected from the group consisting of $C_1$-$C_6$-alkyl and $C_1$-$C_6$-alkoxy;

$R^{24}$ is $C_1$-$C_6$-alkyl or $C_1$-$C_6$-alkoxy;

$R^{25}$ is $C_1$-$C_{10}$-alkyl, $C_1$-$C_{10}$-alkoxy or phenyl which optionally comprises 1, 2, 3, 4 or 5 substituents selected from the group consisting of $C_1$-$C_6$-alkyl and $C_1$-$C_6$-alkoxy; and q is 0, 1, 2, 3, 4 or 5.

16. The polymer composition according to claim 1, containing:
(a) at least one acrylate compound: 1 to 98% by weight;
(b) at least one silyl-terminated polymer: 1 to 98% by weight;
(c) at least one photoinitiator: 0.0001 to 9% by weight; and
(d) at least one further additive: 0 to 98% by weight;
where the acrylate compound and the silyl-terminated polymer are used in a weight ratio of from 50:1 to 1:50; and the photoinitiator (c) and the polymer (a) or (b) which is used in lower amounts are used in a weight ratio of from 1:10 to 1:10000.

17. The polymer composition according to claim 1, which is liquid at 25° C. and 1013 mbar and contains at most 5% by weight, based on the total weight of the composition, of solvents.

18. The polymer composition according to claim 1, which is a hot melt composition at 25° C. and 1013 mbar.

19. An adhesive composition, or a sealant composition, or a gasket composition, or a knifing filler composition or a coating composition, comprising the polymer composition according to claim 1.

* * * * *